United States Patent

[11] 3,618,031

[72] Inventors James A. Kennedy; Aldis Klavins; Robert J. Koegel, all of Phoenix, Ariz.

[21] Appl. No. 50,792
[22] Filed June 29, 1970
[45] Patented Nov. 2, 1971
[73] Assignee Honeywell Information Systems Inc.

[54] DATA COMMUNICATION SYSTEM
20 Claims, 26 Drawing Figs.

[52] U.S. Cl. .......... 340/172.5
[51] Int. Cl. .......... G06f 9/18
[50] Field of Search .......... 340/172.5

[56] References Cited
UNITED STATES PATENTS
3,303,477 2/1967 Voigt .......... 340/172.5
3,530,439 9/1970 Smith .......... 340/172.5

*Primary Examiner*—Raulfe B. Zache
*Attorneys*—Fred Jacob and Edward W. Hughes

ABSTRACT: A data communication system comprises a communications controller and a processor having fixed hardware which utilizes control characters stored in memory to detect the end of messages being received from a variety of terminal devices, to detect changes in message code sets and to perform a variety of other functions. This system can accommodate a wide variety of message code sets, message formats, bit rates and line disciplines without any modification of hardware in the controller and processor.

INVENTORS
JAMES A. KENNEDY
ALDIS KLAVINS
ROBERT J. KOEGEL
BY
Lloyd B. Guernsey
AGENT

USA STANDARD CODE FOR INFORMATION INTERCHANGE

| BITS $b_7$ → $b_6$ → $b_5$ → | | | | | 000 | 001 | 010 | 011 | 100 | 101 | 110 | 111 |
|---|---|---|---|---|---|---|---|---|---|---|---|---|
| $b_4$ ↓ | $b_3$ ↓ | $b_2$ ↓ | $b_1$ ↓ | COLUMN → ROW ↓ | 0 | 1 | 2 | 3 | 4 | 5 | 6 | 7 |
| 0 | 0 | 0 | 0 | 0 | NUL | DLE | SP | 0 | @ | P | ` | p |
| 0 | 0 | 0 | 1 | 1 | SOH | DC1 | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENQ | NAK | % | 5 | E | U | e | u |
| 0 | 1 | 1 | 0 | 6 | ACK | SYN | & | 6 | F | V | f | v |
| 0 | 1 | 1 | 1 | 7 | BEL | ETB | ' | 7 | G | W | g | w |
| 1 | 0 | 0 | 0 | 8 | BS | CAN | ( | 8 | H | X | h | x |
| 1 | 0 | 0 | 1 | 9 | HT | EM | ) | 9 | I | Y | i | y |
| 1 | 0 | 1 | 0 | 10 | LF | SUB | * | : | J | Z | j | z |
| 1 | 0 | 1 | 1 | 11 | VT | ESC | + | ; | K | [ | k | { |
| 1 | 1 | 0 | 0 | 12 | FF | FS | , | < | L | \ | l | ¦ |
| 1 | 1 | 0 | 1 | 13 | CR | GS | - | = | M | ] | m | } |
| 1 | 1 | 1 | 0 | 14 | SO | RS | . | > | N | ↑ | n | ~ |
| 1 | 1 | 1 | 1 | 15 | SI | US | / | ? | O | ← | o | ≡ |

LEGEND

| | | | |
|---|---|---|---|
| NUL | NULL | DLE | DATA LINK ESCAPE |
| SOH | START OF HEADING | DC1 | DEVICE CONTROL 1 |
| STX | START OF TEXT | DC2 | DEVICE CONTROL 2 |
| ETX | END OF TEXT | DC3 | DEVICE CONTROL 3 |
| EOT | END OF TRANSMISSION | DC4 | DEVICE CONTROL 4 (STOP) |
| ENQ | ENQUIRY | NAK | NEGATIVE ACKNOWLEDGE |
| ACK | ACKNOWLEDGE | SYN | SYNCHRONOUS IDLE |
| BEL | BELL (ATTENTION SIGNAL) | ETB | END OF TRANSMISSION BLOCK |
| BS | BACKSPACE | CAN | CANCEL |
| HT | HORIZONTAL TABULATION (PUNCHED CARD SKIP) | EM | END OF MEDIUM |
| LF | LINE FEED | SUB | SUBSTITUTE |
| VT | VERTICAL TABULATION | ESC | ESCAPE |
| FF | FORM FEED | FS | FILE SEPARATOR |
| CR | CARRIAGE RETURN | GS | GROUP SEPARATOR |
| SO | SHIFT OUT | RS | RECORD SEPARATOR |
| SI | SHIFT IN | US | UNIT SEPARATOR |
| | | ≡ | DELETE |

FIG. 3

PATENTED NOV 2 1971 3,618,031

SHEET 06 OF 16

MESSAGE ENDING IN UNIQUE TERMINATE CHARACTER

MESSAGE ENDING IN A CHARACTER PAIR - A UNIQUE CHARACTER FOLLOWED BY A NON-UNIQUE CHARACTER

MESSAGE ENDING IN A CHARACTER TRIPLETT - A UNIQUE CHARACTER FOLLOWED BY TWO NON-UNIQUE CHARACTERS

MESSAGE ENDING IN A UNIQUE CHARACTER AND CONTAINING A MARKER CHARACTER

TYPICAL SYNCHRONOUS MESSAGE

DATA COMMUNICATION SYSTEM

BACKGROUND OF THE INVENTION

The present invention pertains to data processing equipment and more specifically to data processing equipment intended for use with a wide variety of remotely located terminal devices.

Electronic data processing has rapidly become a necessary adjunct to the everyday business world and provides not only a means for calculating, accounting and general data processing, but also provides a source of business management information. To incorporate a data processing system into a business frequently requires a transmission of data for entry into the system over long distances. Terminal devices convert the data from human readable form into binary form and transmit this data over the wires or microwave relay systems from the terminal device to the data processor. There is an almost unlimited variety of terminal devices and new types are being added almost daily. These terminal devices generate a wide variety of message code sets, character lengths, bit rates, message formats, communication line disciplines and mode of transmission in the industry presents an enormous number of problems to the designer of data communications equipment. The data communications equipment must be designed to interface with a wide variety of different types of these terminal devices and should be constructed so that additional devices can be added or the terminal devices connected to the data communications systems can be changed at the desire of the customers.

A control module such as a communications controller is connected between the terminal devices and the data processor. It is desirable to provide a communications controller which is sufficiently flexible to be connected to a wide variety of types of terminal devices having widely different characteristics. However, the efficient operation of design, manufacturing, testing and maintenance functions are not compatible with a proliferation of hardware options, adjustments, patch connection, etc. which have heretofore been employed to affect this flexibility.

Prior art communications systems usually fall into one of the following groups:

1. Many prior art systems are designed with a fixed hardware and are intended to interface with a limited and specific type of terminal devices. This approach is economical but is not very flexible.

2. Other prior art systems have been designed in modular form having many available modular options with each of these modules providing compatibility with a specific terminal device or family of terminal devices. Once the customer's configuration is known, the appropriate optional modules can be connected to a common control module or communications controller in the data communications system. This use of optional modules requires a design of, and capability of manufacturing, testing and maintaining a number of different types of modules. Furthermore, if the communications controller is a multiplexer capable of interfacing a number of communication lines, the hardware in each line module may be different. This precludes the use of common logic to perform those functions which differ among the various line modules so that design efficiency may be sacrificed.

3. Another approach often used in connection with the combination of No. 2 above is the provision of switches, patch plugs or boards, and/or wiring options so as to permit custom configuration of the hardware or hardware modules to obtain compatibility with various terminal devices. Thus, the specific configuration of terminal devices in the field will be different and will probably be in a continual state of flux due to changing customer requirements. This changing of plugboards and hardware modules creates problems in maintaining the data communication systems in various customer installations and in creating software for the purpose of testing and diagnosing the data communications systems. It is very difficult to construct a comprehensive, yet invariant software test package, for a system which has many possible configurations and in which the configurations may change from time to time. Hence, it has often been necessary to initially provide a test and diagnostic package which is individually designed for each of the customer sites, and then make further changes each time the system is changed or reconfigured.

4. The advent of smaller, less expensive computers has made it feasible to employ a computer as a preprocessor in a data communication system. With this approach, the preprocessor accepts each incoming character from each of the data communication lines, it examines the character, determines if it is a special control character, takes appropriate action and stores the character in the memory or buffer allotted to the channel from which the character originated. The computer must be preprogrammed with the configuration of the particular system, and a subroutine in the computer program must exist for each of the types of terminal devices which are connected to the system. The adjustments, patching, etc. are accomplished in software through a set of appropriate subroutines in the program. When a new and different type of terminal device is added to the system, it can usually be accommodated by providing a new subroutine. The disadvantage of this solution to the problem is that each of the subroutines may take a significantly long period of time and these subroutines subtract from the time available to perform other functions in the preprocessor, such as message editing, longitudinal parity and/or cyclically checked functions, line control, and the channel supervision. This causes the number of terminal devices which can be connected to the preprocessor to be greatly reduced if it is necessary that these special functions be performed by the preprocessor.

The instant invention overcomes the disadvantages of the prior art by providing control words and control characters which are stored in the memory of the computer of a data communications system having a communications controller and a preprocessor having fixed hardware. The communications controller uses these control words and control characters to detect the end of incoming messages, to notify the operational software of the receipt of a complete message and to perform a variety of special functions. This relieves the software of the job of checking the incoming characters by program instructions so that the software is free to perform other desired functions while the communications controller checks the incoming message character. This enables the data communication system to service a larger number of terminal devices and causes the cost/performance ratio of the system to be greatly improved over the prior art while retaining complete flexibility. When it is desired to add more terminal devices having different message formats or terminal devices using different code sets, all that is required is that control words and control characters which can be used to check these new code sets and new formats be stored in the memory of the computer. These control words and control characters are used to check the message characters which are received from the new terminal device.

It is, therefore, an object of this invention to provide a new and improved system for detecting the end of a message received from a source of messages.

Another object of this invention is to provide a new and improved system for detecting the end of a message from message sources which use a variety of message formats.

Still another object of this invention is to provide a new and improved system for detecting the end of a message from message sources which use a variety of message codes.

A further object of this invention is to provide a system for detecting a sequence of symbols representing the end of a message.

Another object of this invention is to provide a new and improved system for detecting the end of a submessage received from a source of messages.

A further object of this invention is to provide a new and improved system for eliminating false indications of the end of a message.

A still further object of this invention is to provide a new and improved data communication system for receiving messages from a plurality of terminal devices and for detecting the end of each message received.

Another object of this invention is to provide a system for detecting a variety of symbols each representing the end of a message being received by the system.

A still further object of this invention is to provide a new and improved means of detecting a change in code set being received from a source of messages.

A further object of this invention is to provide a system for detecting a sequence of symbols representing a change in message code.

Another object of this invention is to provide a new and improved data communication system having increased flexibility in the variety of code sets which can be used with the system.

A further object of this invention is to provide a new and improved data communication system having an increased flexibility in the variety of message formats which can be used with the system.

A still further object of this invention is to provide a new and improved data communication system which can be connected to a wide variety of types of terminal devices.

Another object of this invention is to provide a new and improved data communication system which uses a plurality of control words to perform a variety of special functions.

A further object of this invention is to provide a new and improved data communication system which uses a plurality of control words to determine the disposition of each incoming message character.

SUMMARY OF THE INVENTION

The foregoing objects are achieved in accordance with one embodiment of the present invention by employing a data communication system that utilizes a plurality of base address words and a plurality of character control characters to determine the disposition of each character received and to detect the end of a message. A base address word corresponding to each terminal device and a character control character corresponding to each message character are stored in memory. A communications controller combines the base address word with an incoming message character to retrieve a corresponding character control character. The retrieved character control character detects any end of message characters and also directs the disposition of the message character being received.

Other objects and advantages of this invention will become apparent from the following description when taken in connection with the accompanying drawings.

BRIEF DESCRIPTION OF THE DRAWINGS

FIG. 3 illustrates the USA Standard Code which is one of the code sets employed in transferring messages in a data communications system.

DESCRIPTION OF THE PREFERRED EMBODIMENT

Since the present invention pertains to data processing and to data communication techniques, the description thereof can become very complex however, it is believed unnecessary to describe all the details of the data communications system to completely describe the present invention. Therefore, most of the details that are relatively well-known in the art will be omitted from this description. Even though details will be eliminated, a basic description will be given of the entire system to enable one skilled in the art to understand the environment in which the present invention is placed. Accordingly, reference is made to FIG. 1 showing a simplified block diagram of the data communications system of the present invention.

Figure 1:
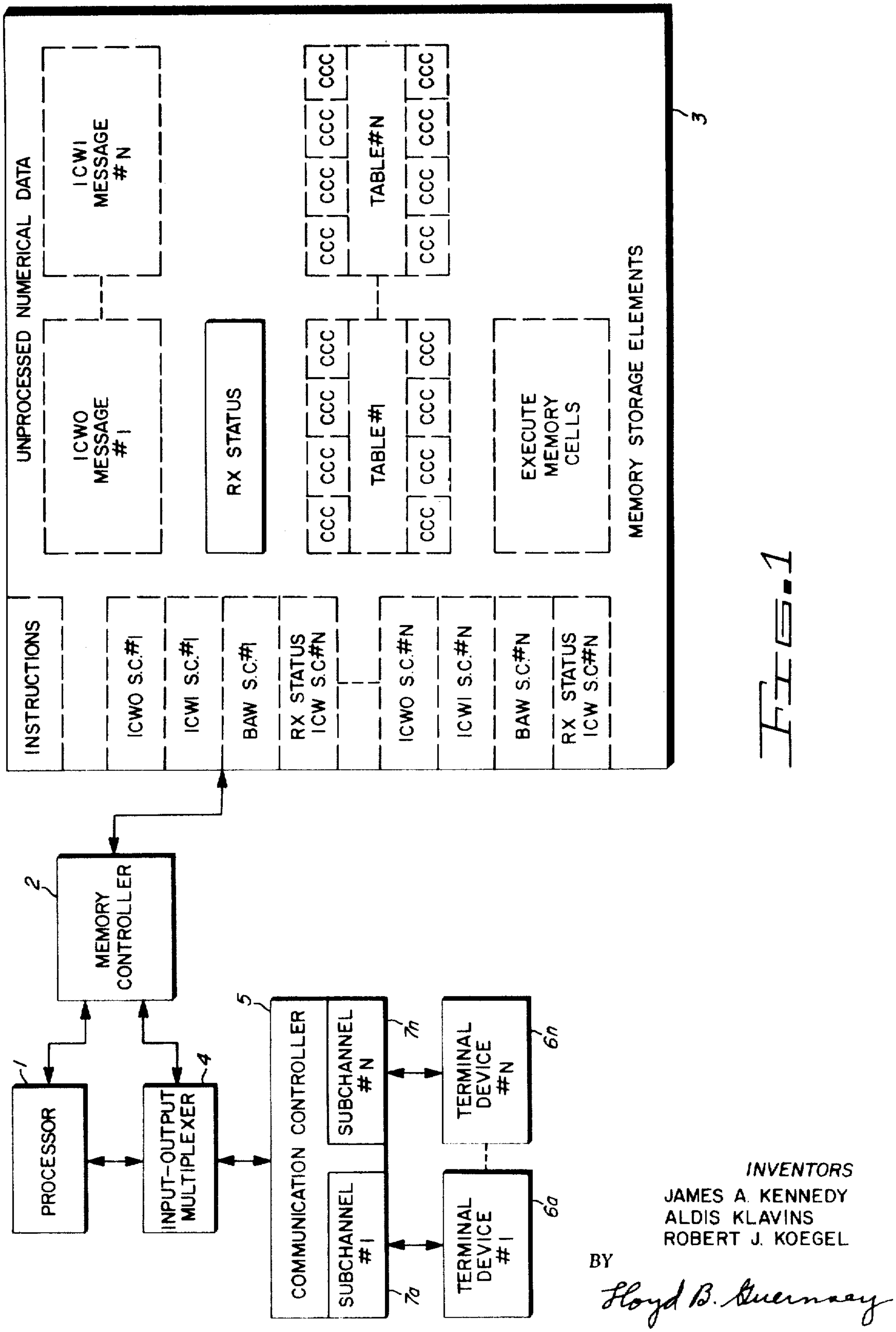
FIG. 1 is a simplified block diagram of a data communications system constructed in accordance with the teachings of the present invention.

The data communications system shown in FIG. 1 includes a data processor 1, a memory controller 2, a memory device or memory 3, an input/output multiplexer 4, a communications controller 5, a plurality of terminal devices 6*a*–6*n*, and a plurality of subchannels 7*a*–7*n*. The processor, input/output multiplexer, and the memory are interconnected by memory controller 2 which controls all communication among the system and performs certain other tasks as will become more apparent as the description proceeds.

The data processor 1 shown in FIG. 1 manipulates data in accordance with instructions of a program. The processor receives an instruction, decodes the instruction and performs the operation indicated thereby. The operation is performed upon data received by the processor and temporarily stored thereby during the operation. The series of instructions is called a program and include decodable operations to be performed by the processor. The instructions of the program are obtained sequentially by the processor and, together with the data to be operated upon, are stored in the memory device. The memory device 3 shown in FIG. 1 may form many of several well-known types; however, most commonly, the main memory is a random access coincident-current type having discrete addressable locations each of which provides storage for a word. The word may form data or instructions and may contain specific fields useful in a variety of operations. Normally, when the processor is in need of data or instructions it will generate a memory cycle and provide an address to the memory. The data or words stored at the addressed location will subsequently be retrieved and provided to the data processor 1.

A series of instructions comprising a program is usually "loaded" into the memory at the beginning of operation and thus occupies a "block" of memory which normally must not be disturbed until the program has been completed. Data to be operated upon by the processor in accordance with instruction of the stored program is stored in the memory and is retrieved and replaced in accordance with the decoded instructions.

Communication with the data processing system usually takes place through the media of input/output devices including such apparatus as magnetic tape handlers, paper tape readers, punchcard readers, and remote terminal devices. To control the receipt of information from input/output devices and to coordinate the transfer of information to and from such devices, an input/output control means is required. Thus an input/output controller or input/output multiplexer is provided and connects the data processing system to the variety of input/output devices. The input/output multiplexer coordinates the information flow to and from the various input/output devices and also awards priority when more than one input/output device is attempting to communicate with the data processing system. Since input/output devices are usually electromechanical in nature and necessarily have much lower operating speeds than the remainder of the data processing system, the input/output multiplexer provides buffering or temporary storage to enable the processing system to proceed at its normal rate without waiting for the time-consuming communication with the input/output device.

The input/output multiplexer as shown in FIG. 1 may have a plurality of input/output devices connected to the input/output multiplexer or input/output controller in the same manner as FIG. 1 of U.S. Pat. No. 3,413,613 by Bahrs et al. and assigned to the assignee of the present invention. The communications controller 5 shown in applicant's FIG. 1 appears to the input/output multiplexer 4 to be an input/output device, but this communication controller in turn controls a plurality of subchannels which may be connected to terminal devices.

To provide flexibility and also to coordinate the communication among the processor, memory, and input/output controller, a memory controller may be utilized. The memory controller is the sole means of communication among the subsystems of the data processing system and receives requests for access to memory as well as specific requests for communication to other subsystems. The memory controller provides the means for coordinating the execution of the operations and transfer of information among the subsystems and also provides the means for awarding priority when access to the memory is requested by more than one subsystem. Memory controller 2 may be of the type disclosed in the above U.S. Pat. No. 3,413,613 by David L. Bahrs et al. It is especially referred to in column 44, line 30, through column 106, line 37.

For a complete description of the processor of FIG. 1 and the instant invention which is embodied in such a processor, reference is made to the above U.S. Pat. No. 3,413,613, issued to David L. Bahrs et al. and assigned to the assignee of the present invention. More particularly, FIGS. 20–38 of the drawings; column 10, line 67, to column 32, line 21, of U.S. Pat. No. 3,413,613 are incorporated hereby by reference and made a part of the instant patent application.

The memory device 3 may be of the type disclosed in a U.S. Pat. No. 3,521,240 by David L. Bahrs, John F. Couleur, and Albert L. Beard entitled, "Synchronous Storage Control Apparatus for a Multiprogram Data Processing System," and assigned to the assignee of the present inventions.

Before beginning the detailed description of the data communication system of the present invention, it is believed that a few words are appropriate concerning the manner in which this portion of the unit will be described. It is to be expressly understood that in the description which follows, much of the control circuit has been omitted for the purpose of brevity and clarity but that these additional circuits would obviously be present in a complete system. However, inasmuch as the generation, use and interrelationship of a large number of these control signals does not, per se, form a part of the present invention, they are not here included. Additionally, it is to be understood that while many single lines are shown interconnecting the various switches, registers, and other components of the system, these lines in many cases represent a bus having multiple conductors. The number of conductors in any bus, will, of course, vary in accordance with the dictates of the individual situation.

GENERAL SYSTEM DESCRIPTION

It is believed that a general description of the operation of the data communication system shown in FIG. 1 will be beneficial at this point. A more detailed operation of this system will be included hereinafter. In this general description, reference will be made primarily to FIGS. 1, 2, 11, 12, 13 and 14. The communications controller 5 of FIG. 1 continuously scans the subchannels 7*a* through 7*n* to see if any of these subchannels have received a complete character from one of the corresponding terminal devices 6*a*–6*n*. When one of the subchannels, for example, subchannel 7*n*, has received a complete character from a corresponding data supply unit 6*n*, the subchannel notifies the communications controller 5 by means of a character-complete signal so that a scanner in the communications controller stops on the subchannel 7*n*. The communications controller 5 now begins a sequence of operations which checks the incoming character to see if this character represents the end of a message, if the character should be stored in memory, and to see if some special operation should be performed.

Figure 2:
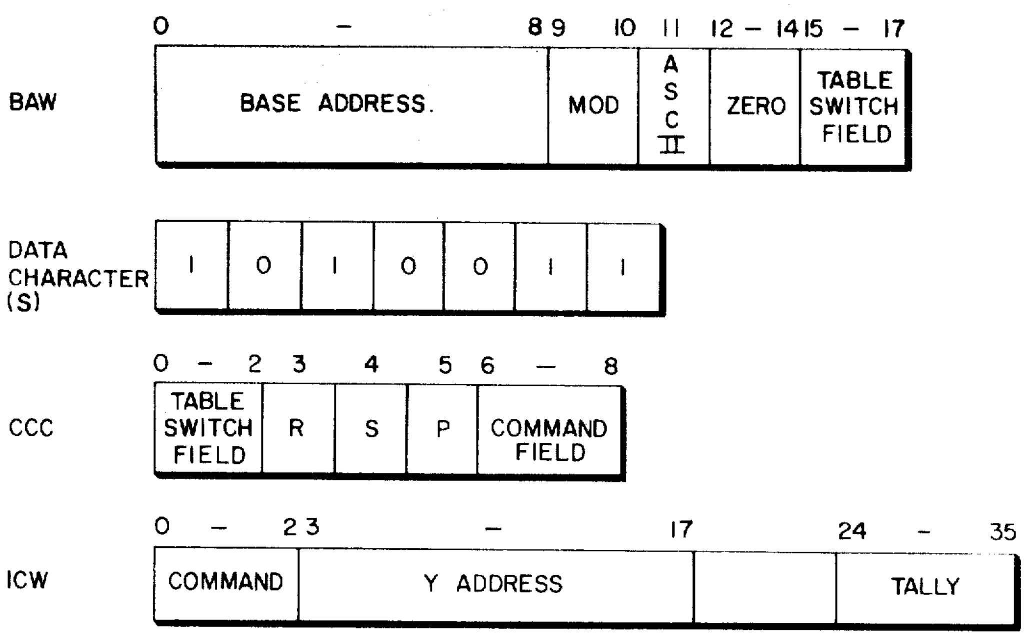
FIG. 2 is a diagram of alphanumeric words used in the communications system.

The character-complete signal causes the communications controller to form the memory address of a base address word or BAW which has been previously stored in memory. The communications controller uses the number of the subchannel as the most significant bits of this address in memory. The BAW, which is unique to the subchannel which provides the character, is read out of the memory from this address and is stored in a register in the communications controller. The format of the BAW is shown in FIG. 2 of the drawings. This BAW has three address fields: a 9-bit base address field, a 2-bit modifier field, and a 3-bit table switch or "T" field. These fields are combined with the message character from a subchannel to form a new memory address for the next cycle of operation, which is the readout of a character control character or CCC from memory.

Figure 11:
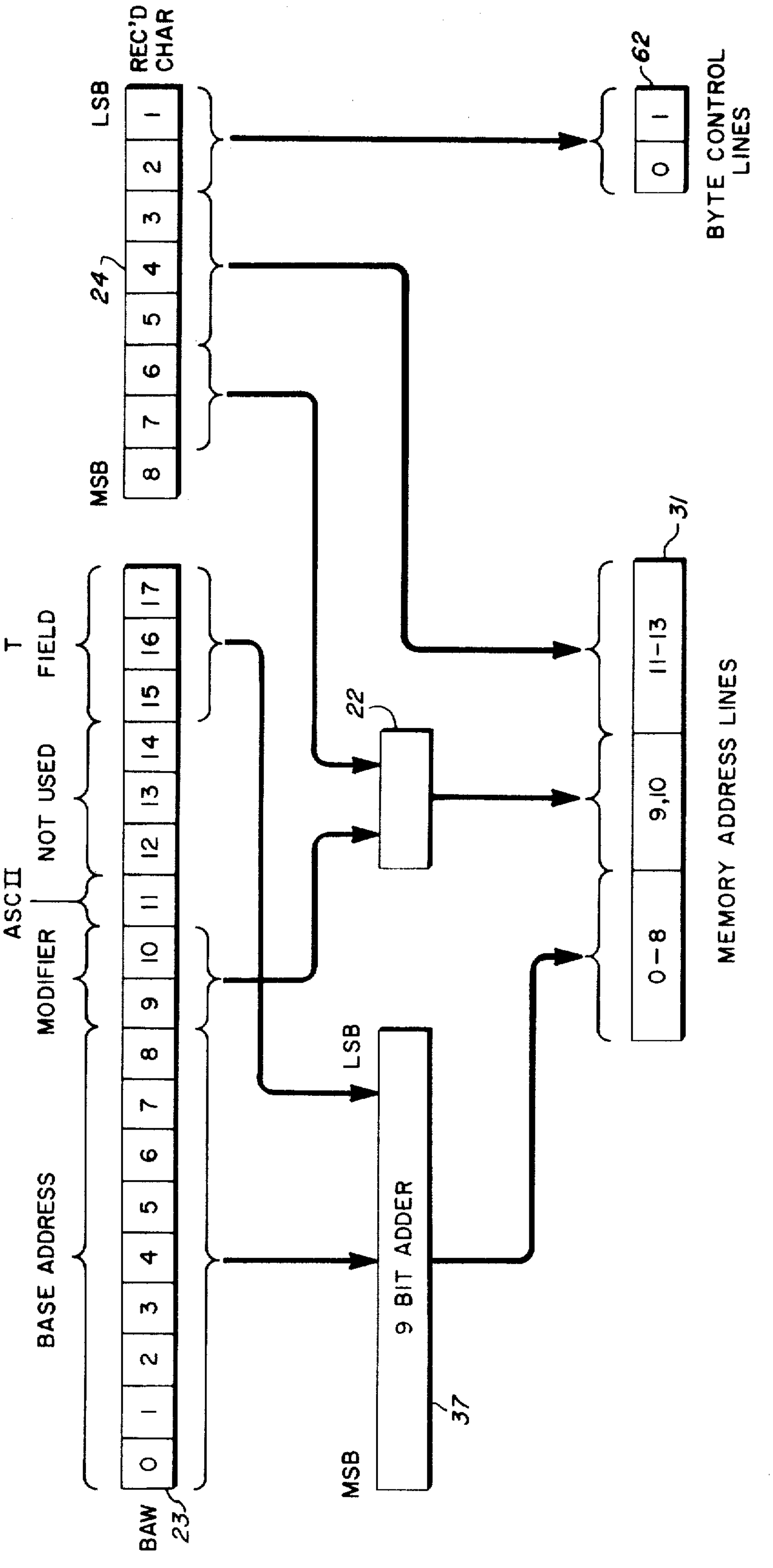
FIGS. 11 and 12*a*, 12*b* and 12*c* illustrate circuitry used to combine a base address word with a message character.
Figure 12A:
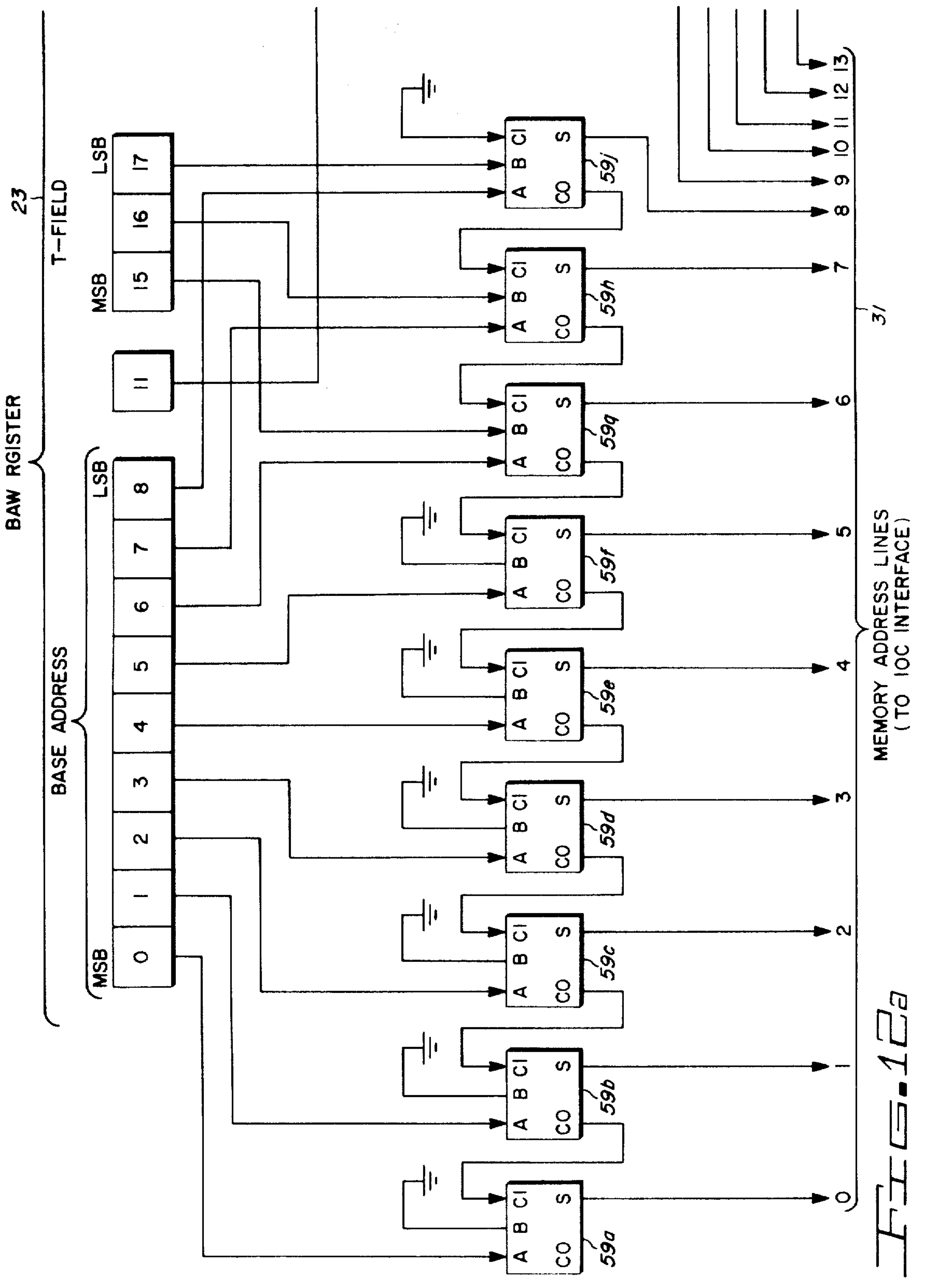
Figures 12B, 12C:
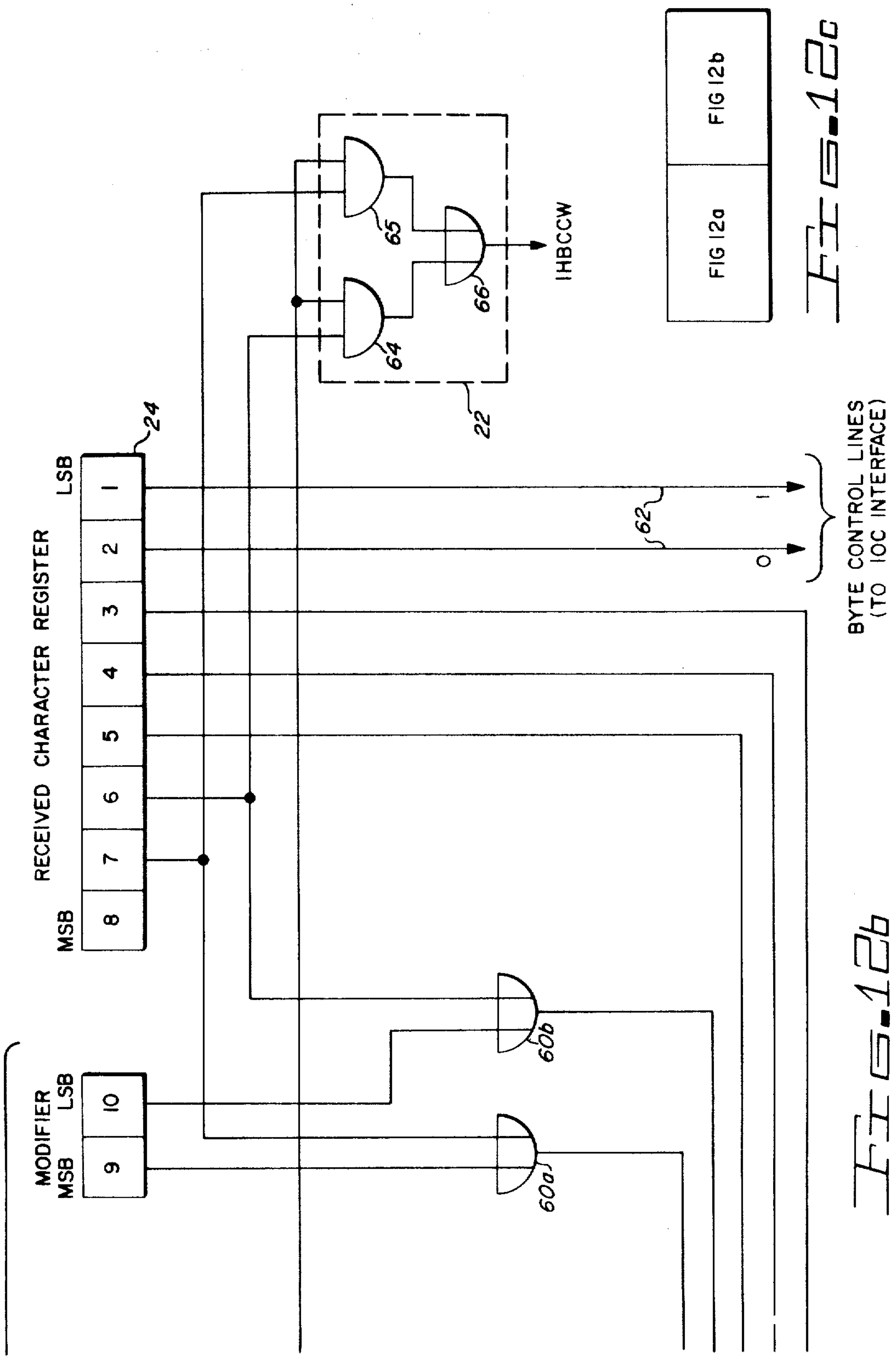

The manner in which the BAW and the message character are combined to form the address of a CCC in memory will be discussed in connection with FIGS. 2, 11, 12 and 13. FIG. 11 shows the manner in which the received data character is combined with various portions of the BAW to form the address of the CCC. The BAW which is stored in a BAW register 23 is combined with a received character which is stored in a message character register 24 and the combined character is coupled to a set of memory address lines 31. FIGS. 12*a* and 12*b* show details of a structure used to form the address of the CCC. FIGS. 12*a* and 12*b* are drawn to be laid side by side as shown in FIG. 12*c* so that the leads from the right side of FIG. 12*a* are connected to the leads from the left side of FIG. 12*b*. FIG. 13 is a memory map which shows the areas in memory which can be accessed by a particular subchannel through the address generated by combining the BAW with the received message character.

Figures 13A, 13B:
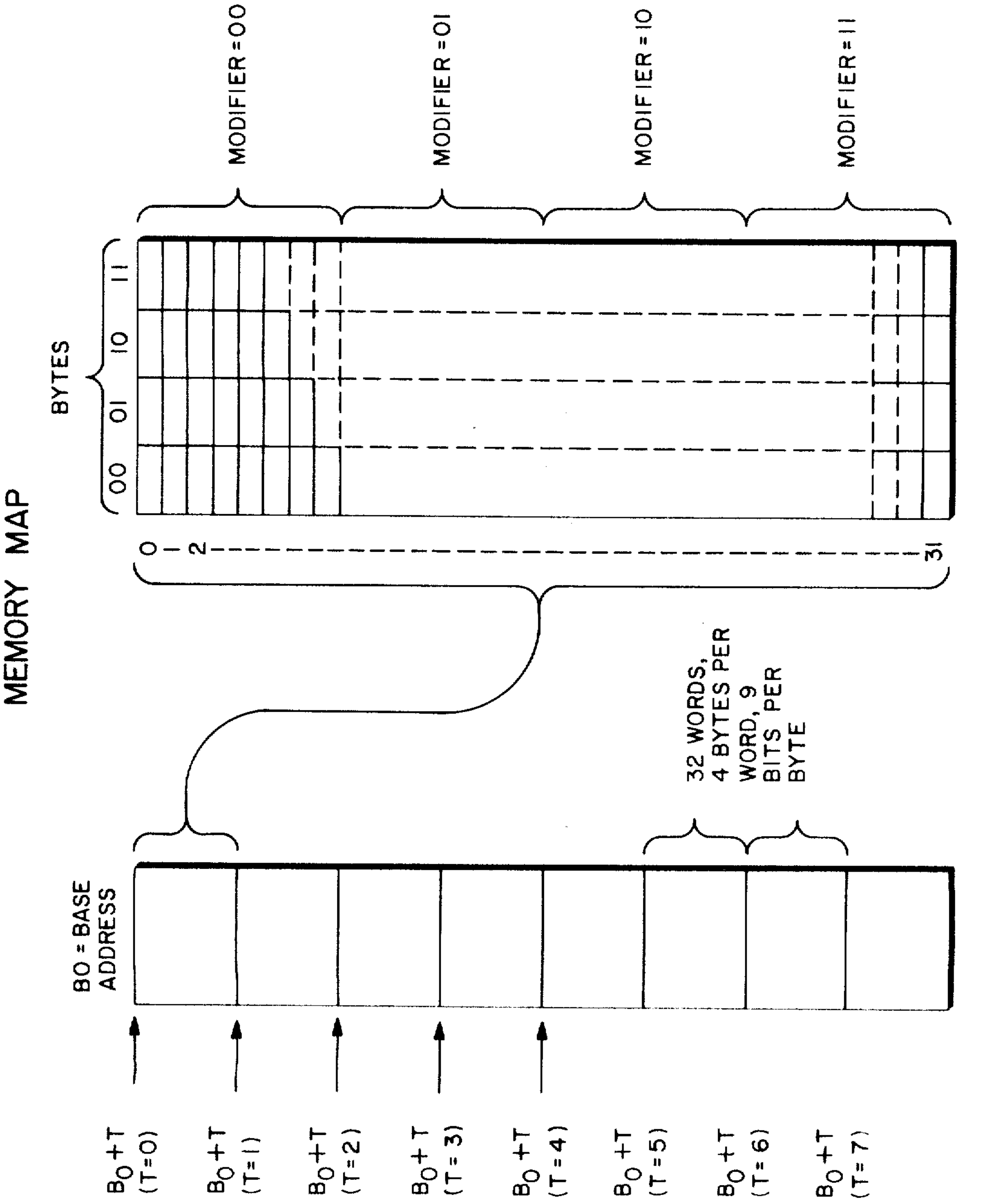
FIGS. 13*a* and 13*b* illustrate the arrangement of character control characters in memory.

Bits 0–8 of the BAW (FIG. 2) constitute a starting or base address in memory and cause the BAW to select one table from a set of eight character control character tables shown in FIG. 13*a*. Each of these eight tables contains 32 words with each word containing four character control characters. The address bits 9–13 on the memory address lines 31 (FIG. 11) select one word from the group of 32 words in a CCC table. Signals on byte control lines 62 (FIG. 11) cause one of the four CCCs in a word to be selected. It will be noted in FIG. 11 that the two byte control lines 62 and the five address lines carrying bits nine to 9–13 receive signals from the seven least significant bits of the received message character. In the example shown the eighth data bit, which may be used as a parity bit in some character sets, is not used. The seven data bits of the received character can be used to select a specific one unique CCC out of a table of 128 CCCs. Since there are 128 possible combinations of data characters which can be received using a 7-bit character, it can be seen that, each of the received data characters selects a different CCC so that each received data character has its own unique CCC in the CCC table.

FIGS. 12 and 13 show how the T or tag field of the BAW may be utilized to select one of the eight CCC tables. The T field is added to the base address using a portion of the 9-bit conventional binary adder comprising the adders 59*a*–59*j*. The adders 59*a*–59*j* shown in FIG. 12 are standard half-adder circuits of the type illustrated on page 159–160 of the text book, Digital Computer Fundamentals by Thomas C. Bartel, second edition, McGraw-Hill Book Company, New York 1966. The starting address of the CCC table can be set at one of the eight locations shown in the memory map of FIG. 13*a* by specifying one of the eight possible values of the 3-bit T field. The T field can be used in this system to permit automatic switching from one CCC table to another, if required, during the process of receiving a message, for the purpose of detecting the end of the message when the message contains multiple code sets or when the message uses a specific sequence of characters to denote the end of the message. Details of accomplishing this table switching will be discussed hereinafter.

So far only 7-bit data characters or 8-bit data characters, including a parity bit have been considered. However, the basic concepts of the present invention could be used so that data characters having a greater or a lesser number of bits could be used. The embodiment shown in FIG. 12 provides flexibility in the location of tables in memory by using a portion of the message character and a portion of the BAW to provide a memory address when 5-bit message characters or 6-bit message characters are used. For example, bits six and seven in a 5-bit message character are zero. Modifier bits (bits nine and 10) of the BAW provide these missing bits to the memory address lines 31. Bits 0–7 of the memory address lines address CCC tables 0–7 in FIG. 13 in the manner described above, so that one of the tables shown in FIG. 13*a* is selected. Each table contains 32 words as shown in FIG. 13*b*. The modifier bits select one of four areas shown in this table and the five bits of the message character select one CCC from the area selected by the modifier bits. In a like manner, when 6-bit characters are used, modifier bit 9 of the BAW can be used to locate the resulting 16-word CCC area in either the upper half or the lower half of a 32-word table. This technique affords flexibility in location of the tables so that tables from different subchannels may be interleaved in the memory to conserve memory space. It would be obvious to one skilled in the art to extend the concept that we have described so as to accommodate message characters having more than seven bits or having less than five bits.

Bit 11 of the BAW is available to perform a special function when the ASCII character set shown in FIG. 3 is being utilized. It can be noted in FIG. 3 that a majority of the special function or control characters of the ASCII character set are grouped in the first two columns of the table and that the bits 6 and 7 of these characters are zero. When one of these ASCII control characters having a zero in bit 6 and 7 is received by the communications controller it is feasible to use the "shortened" table function controlled by the bit 11 of the BAW. When this control character is received by the communication controller, the BAW corresponding to the subchannel which provided the message character is retrieved from the computer memory. If the bit 11 in the BAW is a zero we proceed with the retrieval of the CCC as previously described. If, however, bit 11 is a one, bits six and seven of the message character are examined to see if a CCC should be retrieved from memory. If both bits 6 and 7 of the message character are zero the CCC is retrieved as described above. If either one or both bits 6 and 7 is a binary 1, the CCC cycle is inhibited and the communications controller stores the message character and returns to the scan condition without retrieving the CCC from memory. Thus, when the BAW contains a binary 1 in the bit 11 position the ASCII characters contained in columns 3–7 of the ASCII code table shown in FIG. 3 can be stored in the memory of the data communication system without retrieving a CCC from memory, thereby reducing the time required to store the message characters in memory. FIG. 12 shows the logic comprising AND-gates 64 and 65 and OR-gate 66 which is used to generate a CCC inhibit signal which prevents the retrieval of a CCC from memory.

We have now described how the reception of a complete message character by a subchannel from a data supply or terminal device causes the communications controller to retrieve from memory a BAW which is unique to the subchannel which supplied the message character and have shown how the message character is combined with the BAW to form the memory address of a single CCC from a table of CCCs. This CCC is then retrieved from memory and is stored in a register in the communications controller. The format of the CCC is shown in FIG. 2 and the functions of the various portions of the CCC will now be described.

The table switch field or T field of the CCC includes bits 0, 1 and 2, and corresponds to the T field previously described in the BAW. The T field in the BAW is used to bias or to increase the base address so as to select one of a group of eight contiguous CCC tables as previously described. The T field of the CCC is used to change the T field of the BAW and is used to accomplish "table switching" or switching from one table in memory to another table. The T field of the BAW is always updated or changed by the communications controller so as to agree with the T field in the CCC which has been retrieved and stored in a register in the communications controller. The T field of the CCC which has been stored in one register of the communications controller is compared with the T field of the BAW which had previously read out of the memory and stored in another register in the communications controller. If the two fields are different the communications controller initiates a direct-store cycle at the address of the BAW. This direct-store cycle stores the BAW back in memory, retaining the same base address and modifier as previously read from memory, but substituting the new T field from the CCC for the T field which had been in the BAW. Thus, the next time the subchannel receives a complete character the BAW which is read out of memory will have a new value of the T field and hence a different table will be accessed and a different CCC is read out of memory from the new table on the next cycle.

The command field of the CCC includes bits 6, 7 and 8 and is coded to specify one of eight possible commands. The communications controller retrieves the CCC out of memory, stores it in a register and performs a tag comparison as previously described, then proceeds to decode the command field of the CCC and to perform the functions specified by the command field. The eight possible commands which may be contained in the command field will now be described and discussed. For clarity and ease of explanation these will not be described in their natural binary order.

000 (Normal Characters). This code informs the controller that the received message character is a normal data character and (is not a special or control character) is to be stored in core memory. This storing in core memory is accomplished with the aid of the indirect control word or ICW shown in FIG. 2. The ICW is preset in memory by the software prior to the commencement of the receiving of an incoming message and contains an address field and a tally field which are important in the storage of message characters in memory. The address field of the ICW contains a starting address of a block of memory which the software has set aside or allocated for the next incoming message. The two least significant bits of this address contain the byte position, and the tally portion of the ICW contains the length of the memory block available for storing these characters. When a message character has been received by the communications controller, the communications controller places the character on data lines connected between the communications controller 5 and the input/output multiplexer 4 (FIG. 1); places the ICW address on address lines and commands the input/output multiplexer to store indirect. The input/output multiplexer responds to the indirect store command from the communications controller by retrieving the ICW which is associated with the subchannel supplying the message. The multiplexer then takes the received message character from the data lines of the communications controller, and stores this character in the memory location specified by the address field of the ICW. The input/output multiplexer then increments the address field of the ICW by a count of one, decrements the tally field by a count of one and rewrites the revised ICW back into memory. Thus, when another message character is received from the same controller subchannel it will be automatically stored in the next available memory location. In this manner, the incoming message characters are automatically "packed" contiguously in the memory. The input/output multiplexer monitors the ICW tally field and develops a signal which notifies the software by "program interrupt" when the tally has been decremented to zero. Program interrupt is the well-known process of providing a signal to the computer program which notifies the program that the program being run should be interrupted in order to service a terminal device or to perform other chores.

110 (Don't Store). This code informs the communications controller that the received message character is to be disregarded and is to not be stored in memory. The communications controller essentially throws away this message character and returns to the scanning of the other terminal devices without performing the data store operation. Characters which are placed in empty spaces between message characters or "fill" characters, and characters such as sync and delete would be examples of characters which may be inhibited from being stored in memory by using the "don't store" command.

Figure 14A:
FIGS. 14*a*–14*f* illustrate various message formats used in the data communication system.

011 (Terminate). This code indicates that the data character just received is the final character or terminate character of an incoming message. The communications controller stores the character indirect in memory as described above and then stores a status word or special word in memory indicating in the status word that a terminate character was received. The communications controller 5 then initiates a program-interrupt cycle which is communicated to the processor 1 through the input/output multiplexer 4 (FIG. 1). The software responds to the program interrupt, checks the status word, determines that a terminate character has been received and initiates a routine to process the message. FIG. 14*a* shows an example of the type of message which would utilize the terminate code. This message ends in a unique character, in this case EOT, or "end of transmission." This message is handled by placing the terminate code in the command field of the CCC which corresponds to the EOT character.

Figure 14B:
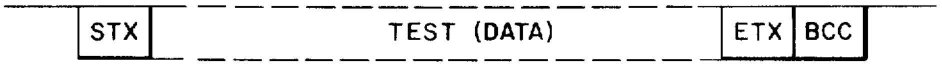
Figure 14C:
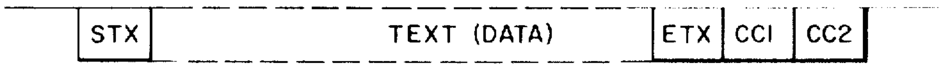
Figure 14D:

001 (Terminate +1). This code is used when the expected message ends in a unique character, such as an ETX or "end of text" character, followed by an additional nonunique character, such as a block check or longitudinal parity character. FIG. 14*b* shows an example of this type of message. When the communications controller receives a CCC having the terminate +1 code it stores the ETX character in memory then waits and stores the following character such as the BCC or "block check character" in memory, then follows with the terminate status word and with the program interrupt.

010 Terminate +2). +2). This is similar to the Terminate +1 except it is intended for messages of the type shown in FIG. 14*c* which end in a unique character such as an ETX followed by two other nonunique characters, such as cyclic check characters. The communications controller waits until the ETX and the two succeeding characters have been stored and then stores a terminate status word and sets the program interrupt.

111 (Marker). This code is used when the software wishes to interrupt a program when a specific character appears within the message. This interrupt is in addition to the normal terminate or end of message interrupt. For example, the program may require an immediate interrupt if a "$" appears in the text as shown in the message format of 14*d*. In this case, the terminate code (011) is placed in the command field of the CCC addressed by EOT character and the marker code (111 ) is placed in the command field of the CCC which is addressed by the $ character. When the communications controller detects the marker code it stores the $ character in memory and then stores a status word indicating the marker condition and sets a program interrupt. The communications controller then continues storing the following message characters as they arrive. When the EOT character arrives, the terminate function is performed as previously described. A marker character may be any character in a message which the software wishes to cause a program interrupt.

100 (Delayed Marker). This code is used when it is desirable for the software to know that a certain specific marker character occurred in the message but it is not desirable to provide a program interrupt each time this market character arrives. For example, the program may require that the $ character previously referred to in FIG. 14*d* be treated as a delayed marker so that the code 100 is placed in memory in the CCC which corresponds to the $ character. When the $ character arrives, in the stream of messages being received by the communications controller, the communications controller sees the delayed marker code in the CCC. The communications controller causes the character to be stored but does not perform the status and interrupt functions. Instead, the controller stores a binary one in a scratch pad memory as a means of "remembering" that the delayed marker has been received. When the EOT character arrives later and the terminate status word is stored, the delayed marker bit is included in the status to indicate that one or more delayed markers were present in the previously received message.

Figure 6:
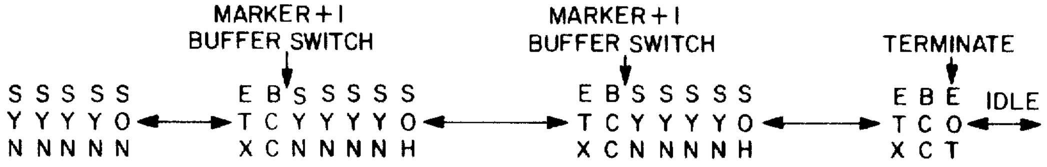
FIG. 6 is a schematic illustration of characters which may be received from a synchronous terminal device.

101 (Marker +1). This code is similar to the marker code (111 ) except that the status word is stored and the program interrupted after storing the message character which follows the marker. In this respect it is identical in operation to the terminate +1 function. A message format in which the marker +1 function might be useful is shown in FIG. 6. This message ends in a EOT character and would use the terminate (011 ) code in the CCC which corresponds to the EOT used to indicate the end of message. However, this message in FIG. 6 is actually made up of blocks or submessages with each block ending in an ETX followed by a block check character (BCC). When certain types of messages are transmitted in the system it may be desirable to have the computer process each sub message as it arrives. This can be done by providing the marker+1 code in the command field of the CCC which is addressed by the ETX character so that a software interrupt will occur after the BCC from each block has been stored.

The eight coded commands which are available in the three bit command of the CCC have now been discussed. There are three special control bits remaining in the CCC which have not been discussed and which will now be described. They are the resync bit (bit three), the buffer-switch bit (bit four), and the parity-inhibit bit (bit five).

Figure 14E:
Figure 14F:
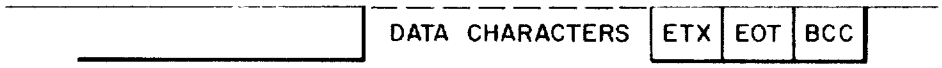

Resync (bit three). This control bit may be used when synchronous data transmission is employed between the communications controller subchannel and a remote data terminal device. When synchronous data transmission is used the subchannel or receiver which is receiving the data stream from the terminal device must recognize a predetermined pattern of bits or characters such as two consecutive ASCII characters, in order to ensure that the receiver is in phase or is synchronized with message characters in the incoming data stream. When the final character of the message has been received, the receiver is returned to a "search" mode so that it will not receive any additional characters until it has once again recognized the sync pattern which usually occurs at the beginning of the next message. The resync bit in the CCC can be used to provide automatic initiation of the search mode if desired. FIG. 14*e* shows a typical synchronous message which may be received by the communications controller. Automatic resynchronization at the end of this message may be accomplished by setting a binary one in the resync bit position (bit three) in the same CCC which contains the terminate +1 command code i.e., in the CCC which is addressed by ETX character. The communications controller detects and remembers the resync bit by storing this bit in a scratch pad memory when the CCC which represents the ETX is retrieved from memory. After the next character, the BCC, is stored the communications controller stores terminate status word, interrupts the program and at the same time sends a resync command to the subchannel in the communications controller.

Buffer-Switch Bit (bit 4). In the discussion of the normal character command the method was described by which data is stored in core memory using an indirect data store command to the input/output multiplexer which in turn employs an ICW to "steer" the data into a core buffer. Two ICW's per subchannel can be stored in memory and the communications controller can address either of these two ICW's when a message character is received from a corresponding subchannel. The Buffer-Switch Bit is used to cause a subchannel to switch from one ICW to the other. This Buffer-Switch Bit may be used in conjunction with the terminate, terminate +1, terminate +2, marker, or marker +1 commands. This switching from one ICW to another occurs after the final message character has been stored and is done in the manner similar to the resync described above. As an example, assume that the data communications system is to receive a series of messages from a data source. The software can be used to store two ICW's in memory with each of the ICW's referring to a separate buffer or empty area in the memory. Message No. 1 arrives and is stored by the use of ICW No. 1 in buffer No. 1. When this first message terminates the buffer-switch bit causes the communications controller to switch from the ICW No. 1 to ICW No. 2. When message No. 2 arrives it is stored by ICW No. 2 in Buffer No. 2. While the second message is arriving the software processes a message which has been stored in buffer No. 1 and also stores a new address in the ICW No. 1 so that this ICW No. 1 will cause a subsequent message to be stored in a new area in the core memory. This provides a convenient way to automatically store messages in blocks or groups in the core memory.

Parity-Inhibit Bit (bit 5). The communications controller includes circuitry for checking the lateral parity of incoming message characters. When a binary one is stored in the parity inhibit bit of a CCC it causes the communications controller to inhibit its parity checking of the received message character. This feature is useful if the incoming message character has two or more groups of characters, where one of the groups of characters utilizes the lateral parity and another group of characters does not utilize lateral parity. An example of this would be the message shown in FIG. 4. This message begins and ends with the conventional ASCII characters which utilize the odd lateral parity in the eighth-bit position of each message character. In the middle of the message however, we find transparent data or data which uses all eight bits of each character as valid data bits and in which no parity bit is present. Thus, if a binary one is stored in the parity-inhibit bit of the CCC, the communication controller will not be used to check parity of the incoming characters which are in the transparent mode.

TABLE SWITCHING

Several basic types of messages have been discussed and the use of single tables to detect the end of message, to perform buffer switching and resynchronization, has been described. There are, however, several message formats now in use which cannot be handled by the features of the invention that have been previously described. The additional power and flexibility to find the end of message in these more complicated message formats can be provided by the table switching function which will now be described.

Table switching provides the capability of detecting specific sequences of two or more characters so that the end of a message which is defined by a set of two or more characters, can be detected. Table switching can be used to detect the end of a message even when the message changes code sets one or more times during transmission, e.g., in transparent transmission parts of the message may be in the ASCII character set while other parts may be in straight binary or in binary coded decimal for efficient transmission of numerical or other special data.

An example will now be used to illustrate how table switching may be employed to detect the end of a message which uses the ASCII character set shown in FIG. 3. Let us assume that the end of a message is defined by the two character sequence such as that shown in FIG. 14*f* where the end of a message is defined by an ETX followed by EOT, followed by a nonunique block check character which is represented by BCC. Detection of the ETX alone or the EOT alone is not sufficient to indicate the end of a message. The data communication system must detect the contiguous character pair of ETX, EOT, then store one additional character, the block check character, and then notify the software by status and program interrupt that the end of a message has been received. All of this can be accomplished by using the two character control character (or CCC) tables shown in FIG. 15.

Figure 15:
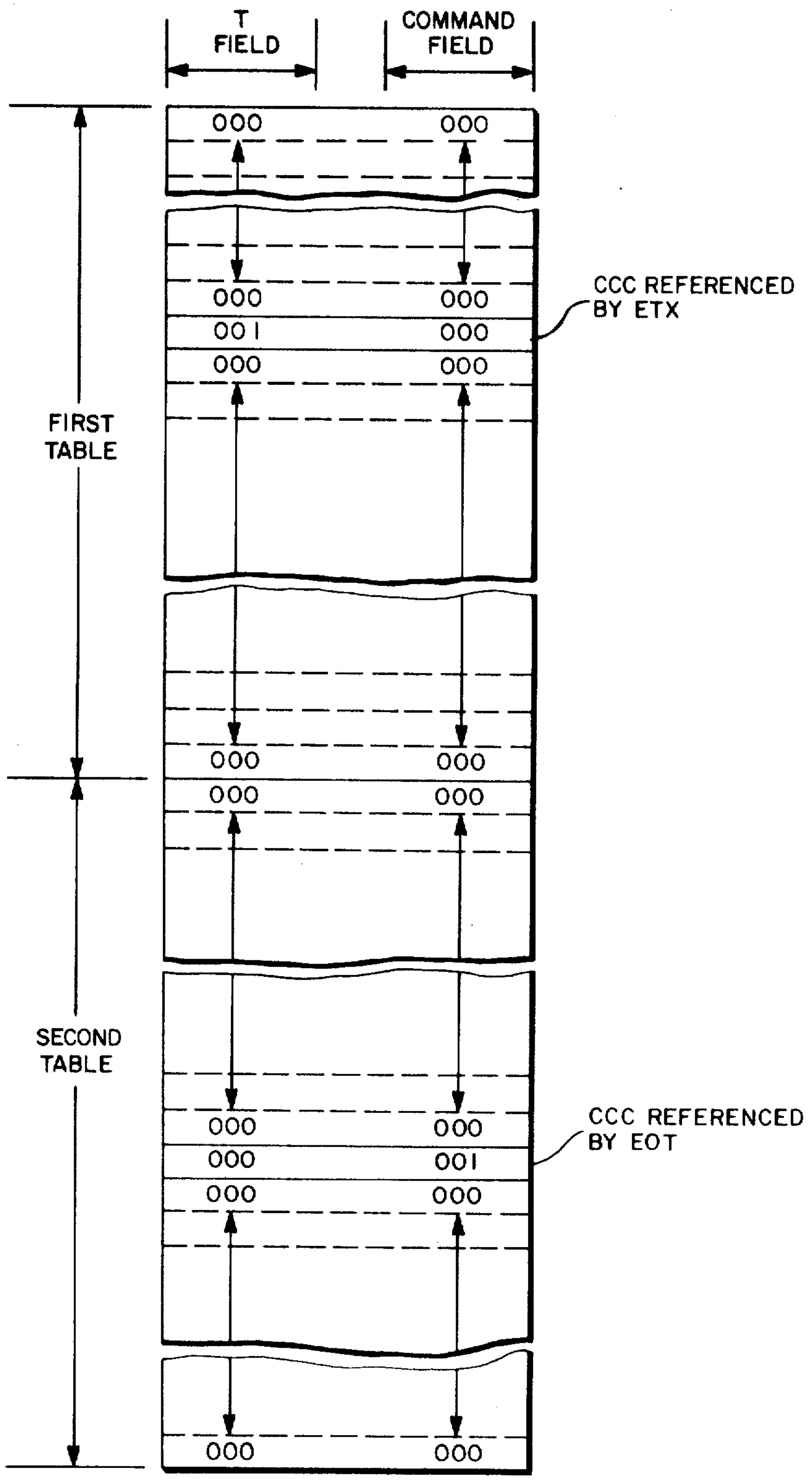
FIG. 15 illustrates details of the arrangement of character control characters in memory.

In the first table shown in FIG. 15, all the CCCs have the normal character code (000) in the command field. All CCCs except the one referenced by the ETX data character have the T field (table switch field) equal to 000 while the CCC referenced by the ETX character has a T field set to 000. In the second table, all CCCs have the T field equal to 000. The CCC referenced by the EOT character has the terminate +1 code (001) in its command field and all other CCCs have the normal character code (000) in the command field. The base address word or BAW for this subchannel has the modifier and T fields equal to zero and has a base address such that the first CCC table will be addressed by an incoming data character. The incoming message characters will each be combined with the BAW and will cause the corresponding CCC to be read out of memory. These CCCs which are read out of memory have the T field equal to 000, which compares with the T field in BAW, so that no updating of the T field in the BAW occurs. These CCCs which correspond to normal data characters also have the normal character code and therefore the data characters are stored in memory with no further action taken. When the ETX character arrives, however, the T field of its CCC is equal to 001, which does not compare with the T field in the BAW. Thus, as we have previously described, the communications controller updates the T field in the BAW and sets it equal to 001. The communications controller then stores the ETX character in memory as the normal character code is present in the command field of the CCC which is referenced by the ETX character. When the next character arrives, the new T field of 001 in the BAW adds to the base address and causes the second CCC table to be addressed (FIG. 15). Since all CCCs in the second table have the T field equal to 000, the BAW T field is again updated and set to 000. If this data character which follows the ETX is not an EOT the corresponding CCC read from the second table has a normal character code of 000. Thus, we are now back to the original or starting conditions with the T field in the BAW equal to 000 so that the next message character which is received will again access the first CCC table, and we have effectively ignored the sequence of an ETX followed by a character which is not an EOT.

However, if the character following the ETX is an EOT, the corresponding CCC which is read out of the second table contains the terminate +1 code. The communications controller is thus instructed to store one additional character, which is the block check character, when it arrives and then notifies the program by appropriate status and interrupt signals. The T field in the BAW is then restored to 000 so that the system is reset to the starting conditions in preparation for the next message which may arrive.

The message formats which have been illustrated above have assumed the use of one of the many message codes, such as the ASCII code which was illustrated previously. Such character code sets usually include alphabetic, numeric, punctuation and control characters and are most effective where man/machine interface is involved; i.e., where the communications data flow is between a data processor and peripheral devices, where humans either originate or retrieve the computer data. Examples of this man/machine interface would be typewriters, line printers, card readers, etc. However, there are many applications where the use of such general purpose character sets would be very inefficient. For example, data which is transferred between two data processors may be predominantly decimal, numeric or binary and the ASCII character set would not be efficient for transferring this type of data from one processor to another. The ASCII character set is composed of seven bit data characters plus a parity bit so that a total of 128 possible characters can be represented. If the data to be transferred between one processor and another is all decimal numeric, there is a considerable reduction in transmission efficiency since decimal numeric digits require only four of the eight bits normally transmitted by ASCII characters. If the code set is not used and straight binary data is transmitted the addition of the normal parity bit to each group of data bits results in interruption of the continuity of the binary data. The receiving processor would have to remove the parity bit from the characters and repack the data to restore continuity. This would require a considerable portion of the processing time and would result in very low transfer efficiency.

Figure 4:
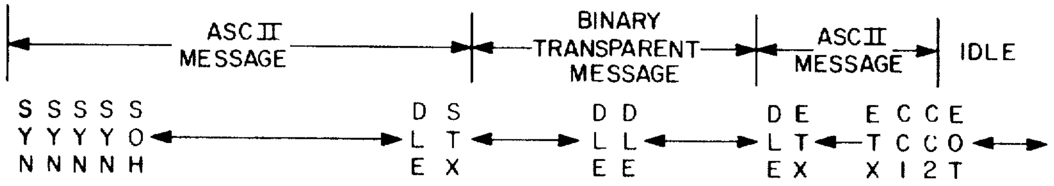
FIG. 4 shows a combination of messages which may be received by the data communications system.

To improve the efficiency of transfer of numerical data between processors, it is possible to utilize the so-called transparent mode of transmission. There are several different forms of transparent mode now used in the industry in which the message and the data characters are not coded in the usual manner. FIG. 4 shows one example of a form of message format in which transparent transmission is used for a portion of the message. The beginning portion of this message is composed of the regular ASCII characters each having a parity bit with transmission in a synchronous mode. The beginning portion of the transparent message is characterized by the DLE STX character pair. This character pair signals the receiver that the data which follows is not in the ASCII code.

Lateral parity is not used in the transparent mode so that all bits of each character in the transparent mode are used exclusively for data. A data character may contain straight binary information, or it may contain a pair of binary coded decimal digits, or any other form which may be desired. The end of a transparent section of message is indicated by the character pair DLE ETX as shown in FIG. 4. This character pair signals the receiver that the transparent transmission has been completed and that the receiver is now to reenter the ASCII mode. Each of these characters has an ASCII code representation which is DLE 0010000, STX 0000010, ETX 0000011.

It is desired that the receiving system not respond to any other control characters except the pair of DLE ETX during the transparent transmission and that it should ignore any apparent lateral parity errors which occur since the lateral parity is not valid during the transparent transmission.

This two character sequence solves the problem of changing modes of data transmission but introduces the possibility of erroneous transmission. The DLE ETX sequence is obviously a valid sequence of binary numbers and is also the packed decimal representation of 1,003. To avoid erroneous transmission, it is necessary to prevent the control function from being initiated prematurely. The erroneous detection of an end of transparency by the receiver can be prevented by the following procedure. The transmitter is designed or programmed so that during transparent transmission it automatically inserts an extra DLE character in its output stream immediately following any DLE character which it transmits onto the line between the data supply and the subchannel. Thus, the DLE ETX combination cannot be inadvertently transmitted prior to the end of transparent transmission. The receiver is designed or programmed to discard the second DLE of a DLE DLE pair it receives during transparent transmission.

The end of the message shown in FIG. 4 is characterized by an EOT character which is preceded by a pair of cyclic check characters CC1 and CC2. The receiver must respond to the EOT only during the nontransparent or ASCII portion of the message. The binary bit pattern during transparent transmission could assume the same bit pattern as the ASCII EOT character, but this would not be a valid end of transmission indication.

Figure 5:
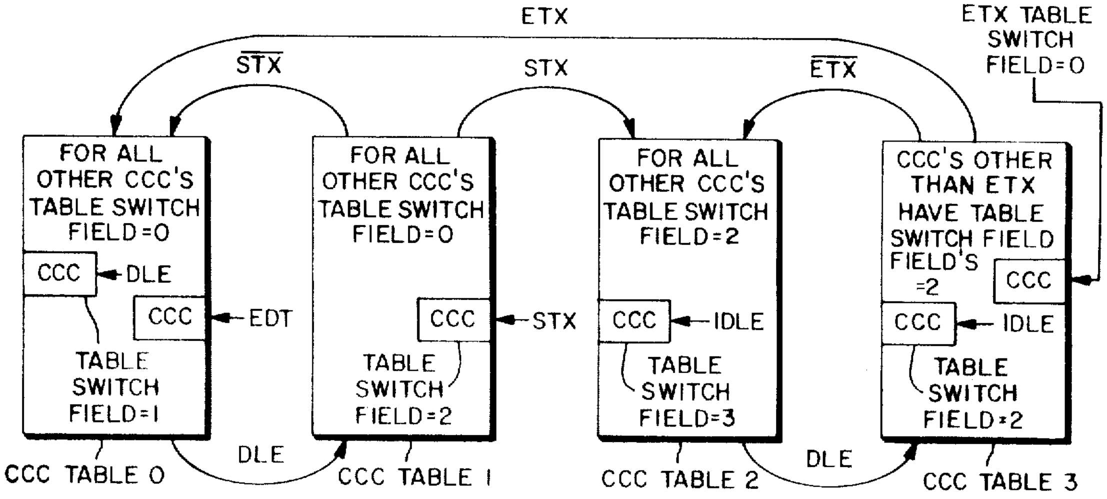
FIG. 5 illustrates the arrangement of the character control characters in the magnetic memory of FIG. 1.

In the present invention the valid end of a message for the format of FIG. 4 can be detected by using a set of four character control tables such as those shown in FIG. 5. Table 0 in FIG. 5 is accessed during the ASCII portion of the message. All of the CCCs in table 0 have the T field equal to 0 except for the CCC which is addressed by DLE, which has a T field equal to one. The CCC addressed by the EOT character has a terminate code (011) in the command field. When a DLE character arrives, the T field of one in the corresponding CCC causes a table switch to table 1. Table 1 is an intermediate table which is used to determine if the STX follows the DLE. All CCCs in table 1 have a table switch field equal to zero except the CCC which is accessed by STX, which has a T field equal to two. Thus, if any character except the STX follows the DLE, operation will switch back to table 0 and the normal ASCII mode will be continued. If the character following the DLE is an STX operation will switch to table 2.

Table 2 is a table which is utilized during the transparent portion of a message. All of the CCCs in table 2 have the table switch field equal to two, except the CCC which is addressed by the DLE, which has a T field equal to three. Thus, we will continue to use table 2 until a DLE is received, which causes a switch to table 3. All CCCs in table 2 have the priority inhibit bit set. This inhibit bit causes the communications controller to inhibit parity checks on the data being received because parity is not used during transparent transmission.

The first DLE received during transparent transmission causes operation to switch from table 2 to table 3. Table 3 is an intermediate table used to detect if the ETX follows the DLE. All CCCs in table 3 have the table switch field equal to two except the CCC which is addressed by ETX which has its T field equal to zero. Thus, if any character except the ETX follows a DLE operation switches back to table 2 and the transparent mode is continued. If an ETX follows a DLE, operation switches to table 0 and the ASCII mode is again used. The CCC in table 3 which corresponds to the DLE may have its command field coded to the "don't store" command previously described. This "don't store" command will automatically cause the second DLE of a DLE DLE pair to be discarded during transparent transmission.

Figure 7:
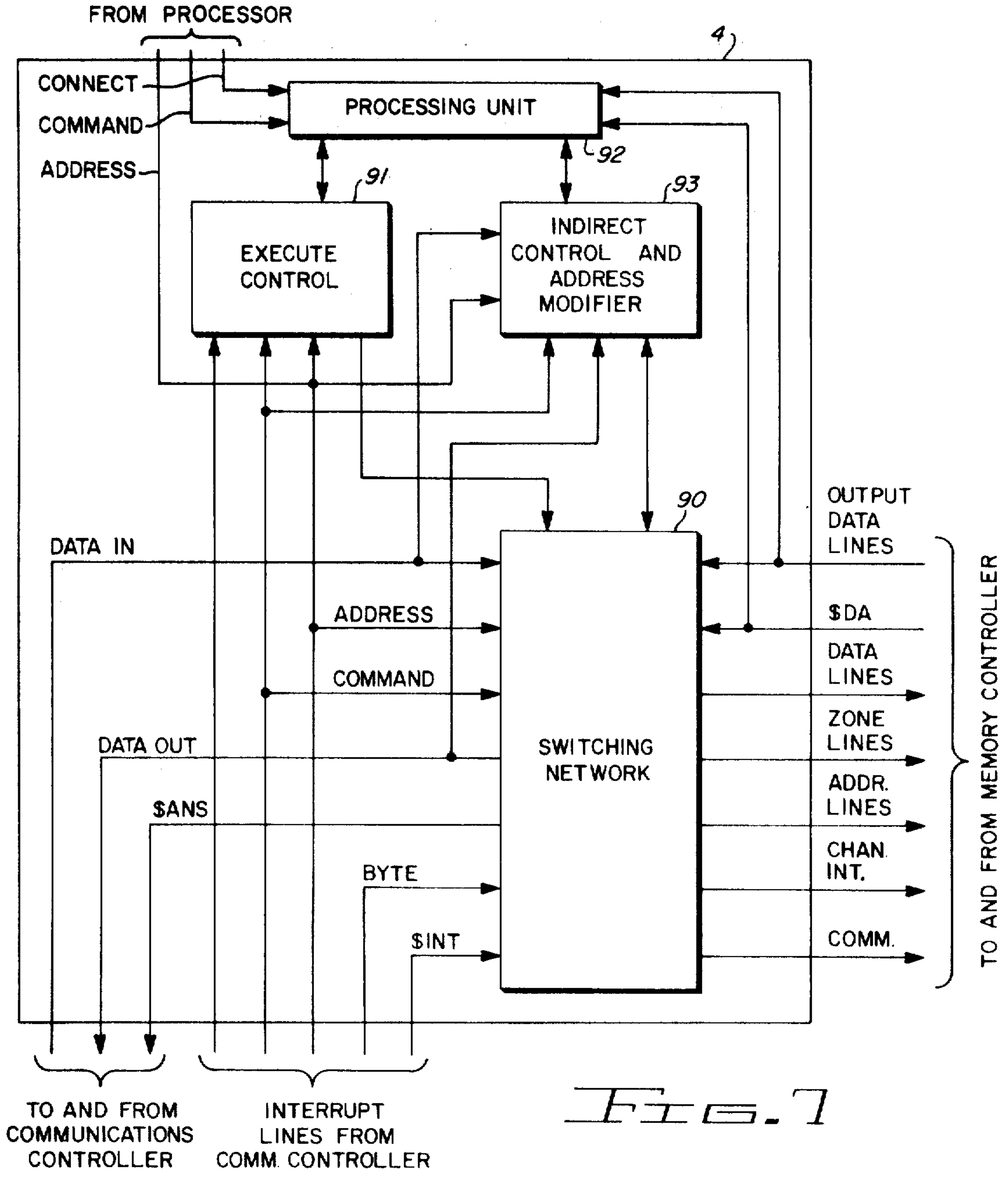
FIG. 7 is a block diagram of a portion of the input/output controller shown in FIG. 1.

One form of input/output multiplexer suitable for use with the data communications system shown in FIG. 1 is illustrated in FIG. 7. This input/output multiplexer comprises a switching network 90, an execute control 91, a processing unit 92 and an indirect control and address modifier 93. Execute control 91 may comprise a control matrix or set of gates provided to route logic signals through the input/output multiplexer in response to signals on the INTERRUPT lines, the COMMAND lines and the ADDRESS lines to thereby control the operation of storing interrupt requests from the communications controller into the memory. Processing unit 92 may comprise arithmetic units and register for temporarily storing addresses and also control gates for use in manipulating addresses and data to perform address modification in a manner to be described hereinafter.

The indirect control and address modifier 93 may comprise a plurality of gates which respond to signals supplied on the COMMAND lines, the ADDRESS lines and the DATA IN lines to provide control signals for controlling switching to network 90. Switching network 90 may comprise a plurality of sets of switching gates which respond to various control signals from execute control 91 and from the indirect control and address modifier 93 to control transfer of signals between the communications controller 5 and the memory controller 2 shown in FIG. 1. For example, signals from control 91 and from modifier 93 may be used to connect the ADDRESS lines from the communications controller to the ADDR. lines going to the memory controller, the COMMAND lines may be connected to the COMM. lines, the BYTE lines may be connected to the ZONE lines, the $INT may be connected to the CHAN. INT lines, the DATA IN lines may be connected to the DATA lines, the DATA OUT lines may be connected to the OUTPUT DATA lines and the $ANS lines may be connected to the $DA lines.

The input/output multiplexer 4 responds to signals from the communications controller 5 during data storage and retrieval operations to provide control signals and data signals to and from the memory controller 2 (FIG. 1). The $INT line is normally connected to the CHAN. INT line so that the $INT signal from the communications controller causes the memory controller to grant access to the memory. Following the $INT signal the communications controller will apply a plurality of signals on the ADDRESS lines, the COMMAND lines, the INTERRUPT lines, the BYTE lines and the DATA IN lines to the input/output multiplexer and to switching network 90. When it is desired that data be stored in the memory a storage command and a control command specifying whether the storage is to be performed in a direct or an indirect manner will be transferred over the COMMAND lines. If storage is to be performed in a direct manner the address of the location where the information will be stored will be supplied by the communications controller through network 90 to the memory controller 2. The direct control command is applied to indirect control and address modifier 93 which responds to apply control signal to switching network 90 which causes the ADDRESS line to be connected to the ADDR. lines, the BYTE lines to be connected to the ZONE lines, the DATA IN lines to be connected to the DATA lines and the COMMAND lines to be connected to the COMM. lines. Upon completing the storage operation the memory controller 2 will generate a $DA signal which is applied to switching network and processor unit 92. Since a direct operation was specified, switching network 90 will couple the $DA signal to the $ANS line and apply the $ANS signal to the communications controller to indicate that the storage operation had been completed.

When a word is to be stored indirectly in memory an indirect store signal is coupled over one of the COMMAND lines from the communications controller to the indirect control and address modifier 92 in the input/output multiplexer. Signals are also applied to the ADDRESS lines, the COMMAND lines, the BYTE lines and the DATA IN lines causing the indirect control and address modifier 93 to apply control signals to processing unit 92 and also supply control signals to switching network 90 which will cause an indirect control word or ICW to be retrieved from memory. The retrieval command will be transferred from the COMMAND lines through switching network 93 to the COMM. lines which are coupled to memory controller 2. The memory controller responds to the signals on the ADDR. lines, the ZONE lines and the COMM. lines to retrieve the ICW from memory and place the ICW on the OUTPUT DATA lines and also provide a signal on the $DA line to the switching network 90 and to the processing unit 92. Signals on the OUTPUT DATA lines and on the $DA line cause the indirect control and address modifier 93 to store the ICW in a register in processing unit 92. Processing unit 92 now provides a signal to the CHAN. INT line and also supplies a store command on the COMM. line to the memory controller. Signals on the DATA IN line are coupled through the switching network 90 to the DATA lines so that the data will be coupled to the memory controller and to the memory. At the same time the indirect control and address modifier 93 will provide signals which determine the address of the memory where the data will be stored. Upon storing data the memory controller will again provide a $DA signal to switching network 90 which will couple this to the $ANS line going to the communications controller. Processing unit 92 now modifies the address portion of the ICW by adding a binary one to the address portion such that the next time the ICW is retrieved from memory the address will be incremented by one to the next location in memory where data is to be stored. The ICW is now applied through indirect control and address modifier 93 and through switching network 90 to the memory controller which causes the ICW to be again stored in memory.

OPERATION OF THE SYSTEM

Figure 8A:
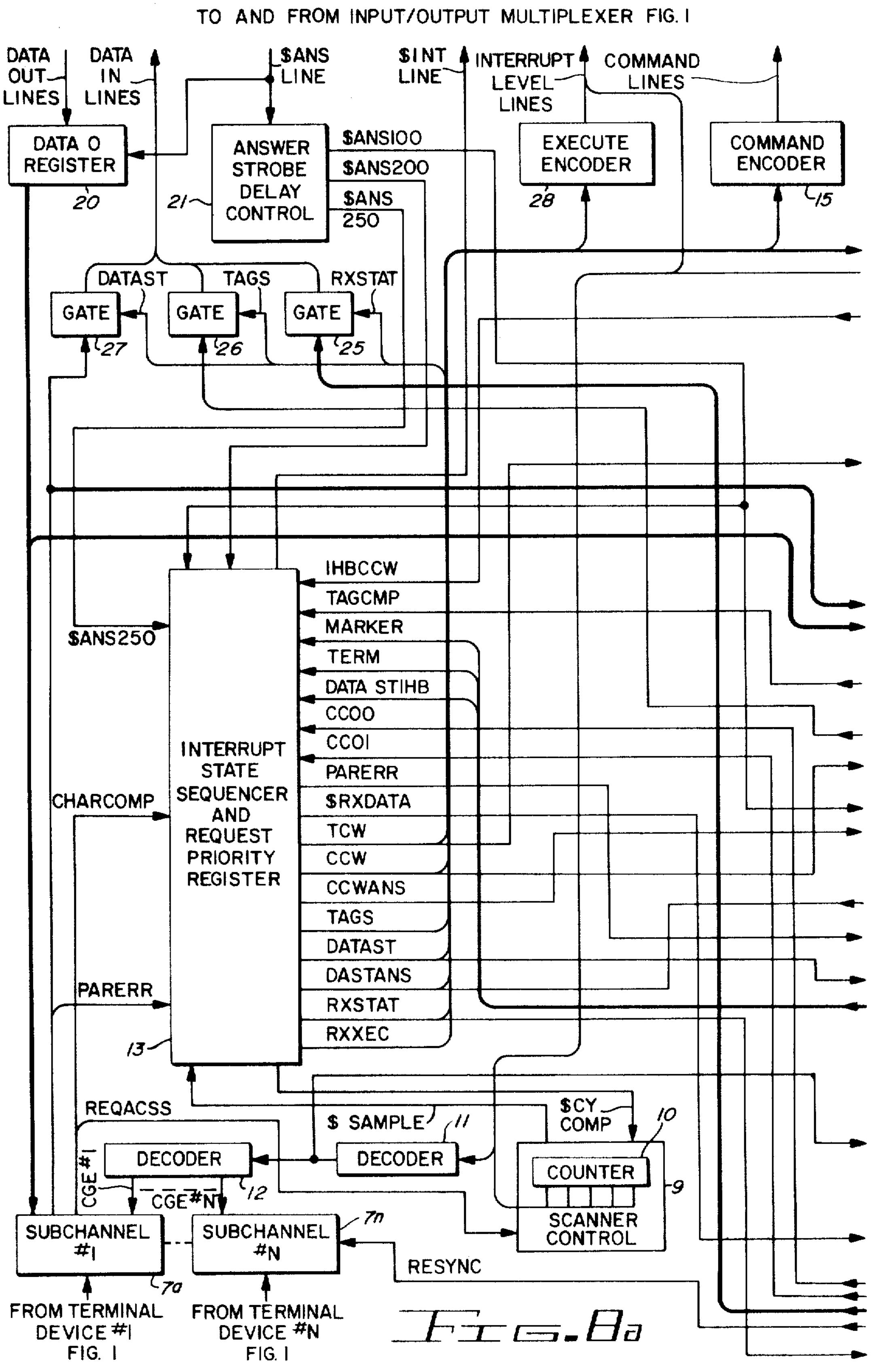
FIGS. 8*a* and 8*b* comprise a block diagram showing details of the communications controller of FIG. 1.
Figure 8B:
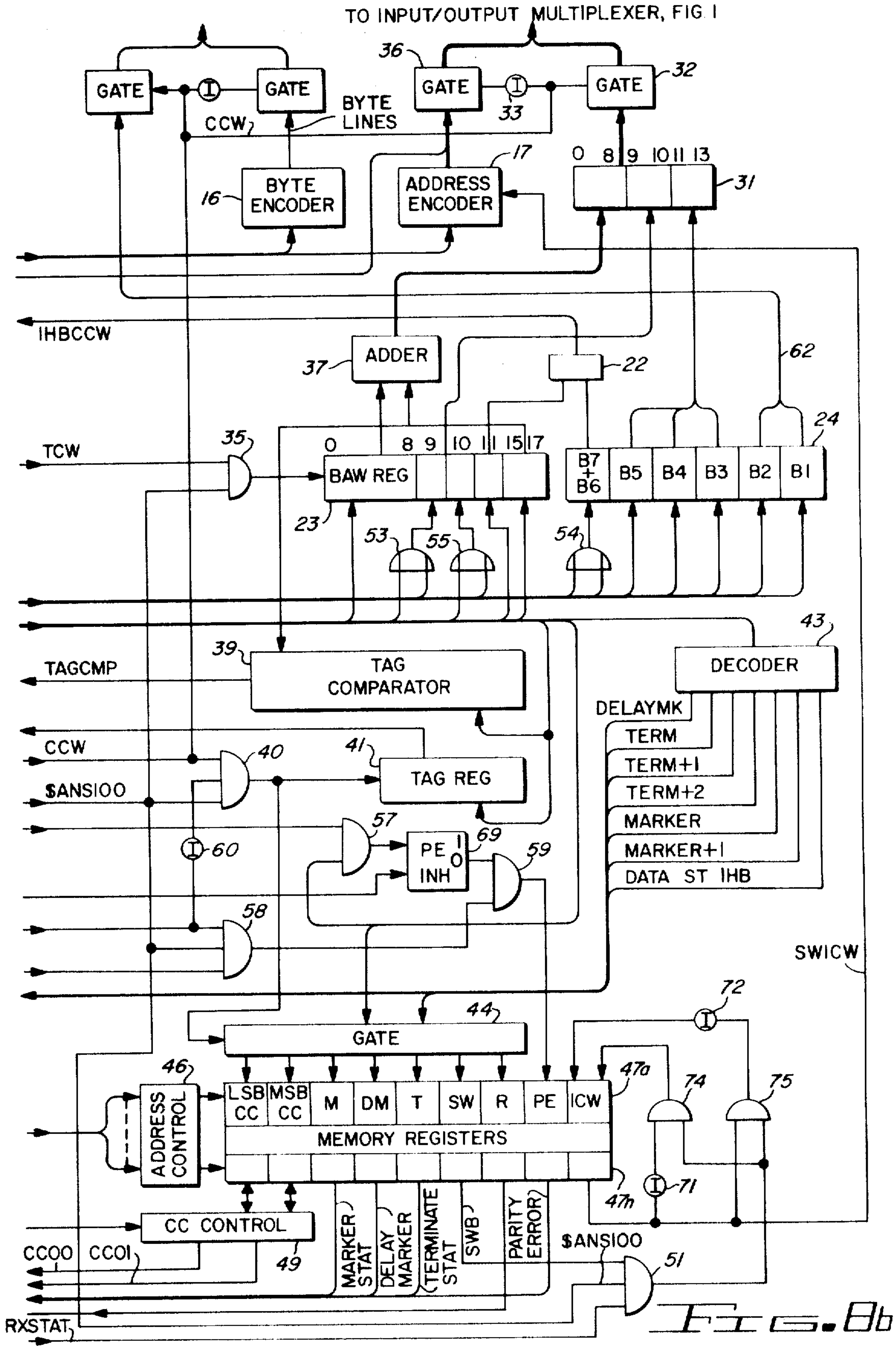
Figure 10A:
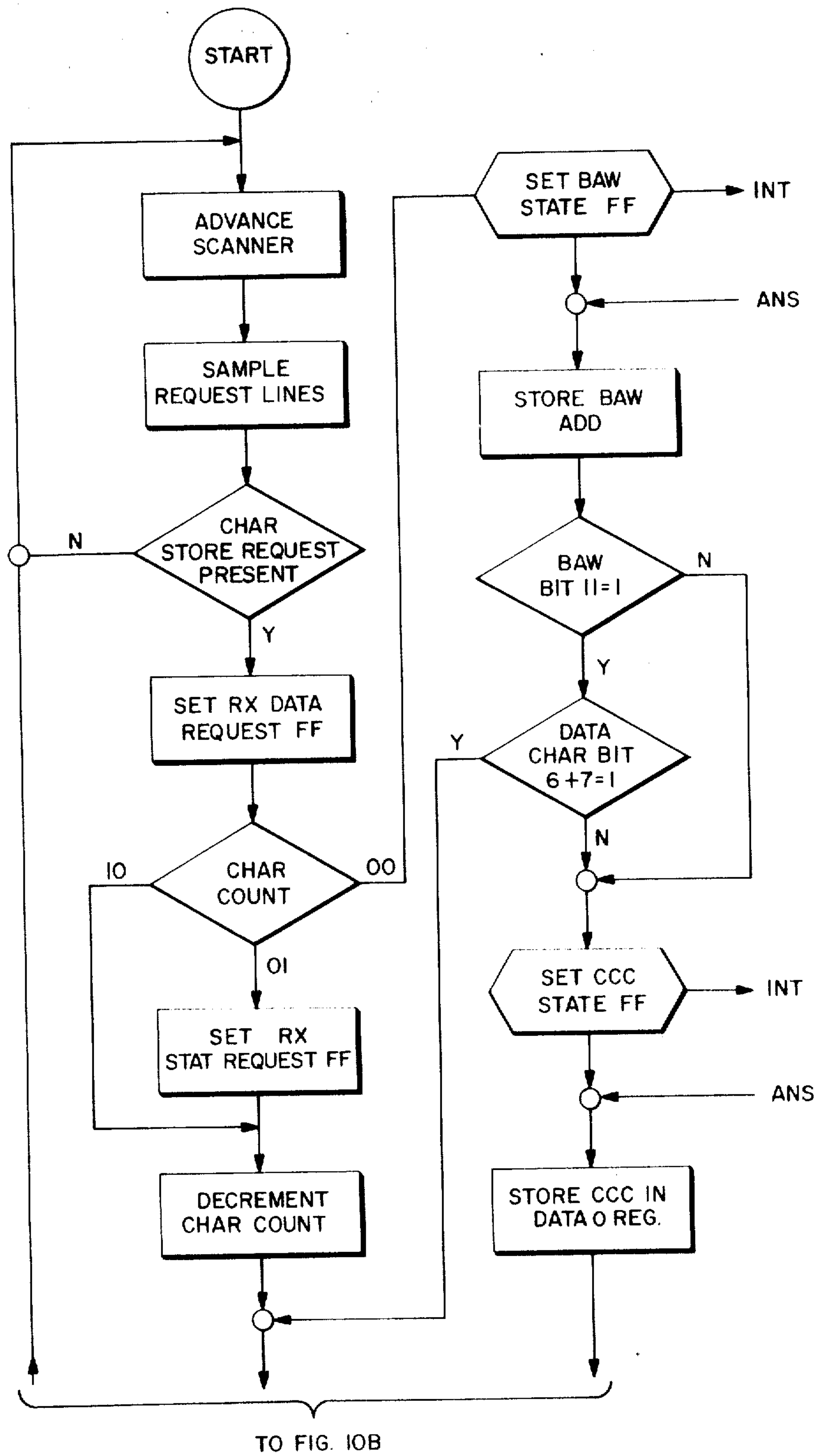
FIGS. 10*a* and 10*b* comprise a flow diagram showing the sequence of operation of the data communications system of FIG. 1.
Figure 10B:
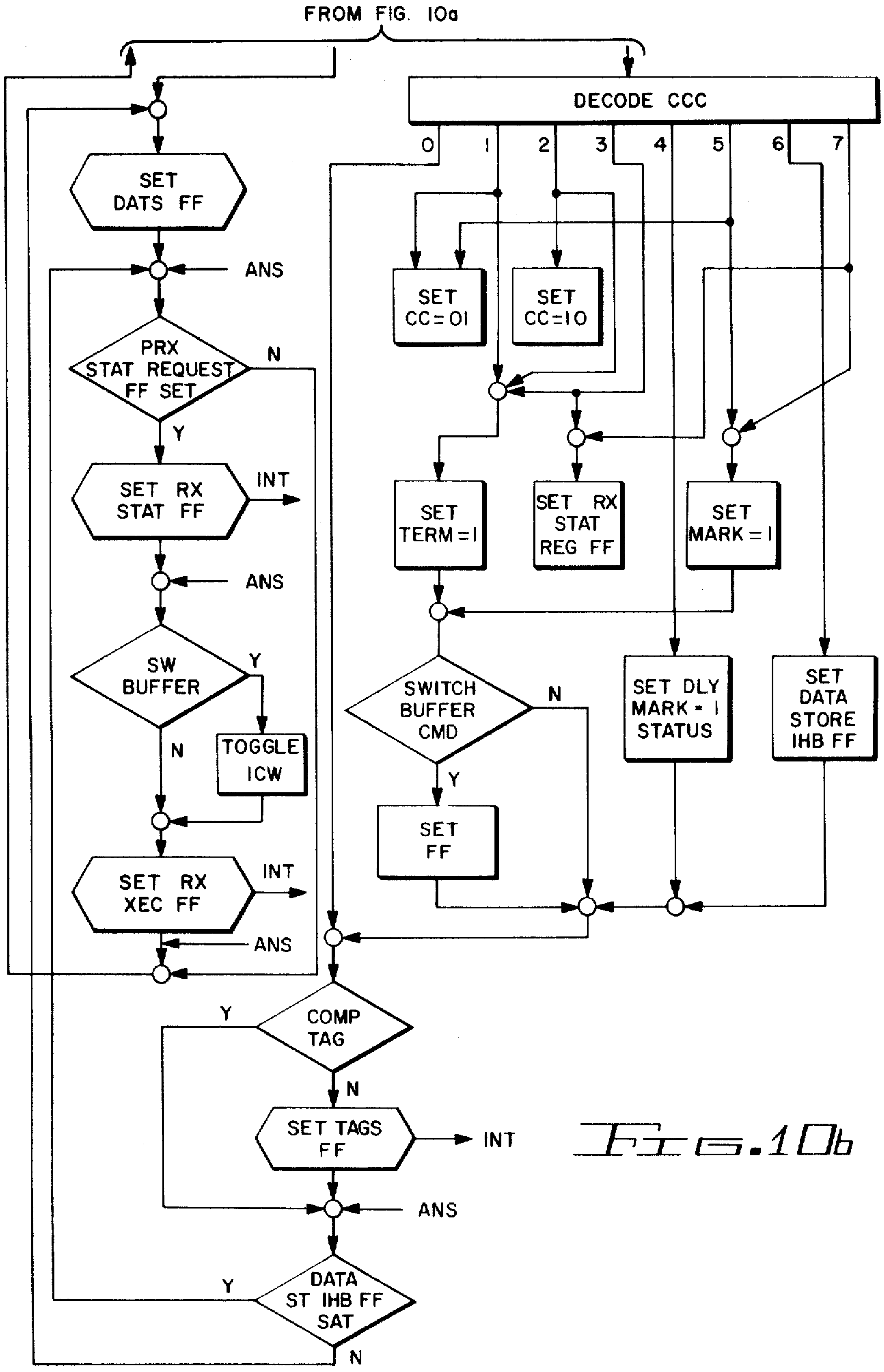

The operation of the data communication system in FIG. 1 will now be described in connection with the flow chart shown in FIGS. 10and 10*b* and the communications controller shown in more detail in FIGS. 8*a* and 8*b*. Portions of this description will also refer to the other figures in the drawings. It should be noted that FIGS. 8*a* and 8*b* are drawn to be laid side by side so that the leads from the right-hand side of FIG. 8*a* make connection with the leads from the left-hand side of FIG. 8*b*. In a similar manner FIG. 10*a* is drawn to be placed above FIG. 10*b* so that the lines from the lower portion of FIG. 10*a* are connected to the lines at the upper portion of FIG. 10*b*.

All data transfer between the input/output multiplexer and the communications controller employs an interrupt-answer scheme. That is, the multiplexer is interrupted by the controller and requested by a command from the controller to either store data in memory or retrieve data from memory. The location of the memory address where the data is stored or from where it is retrieved is determined by an address which is presented at the time of the interrupt. This address in memory may be determined either directly or indirectly. With indirect addressing an indirect control word is employed to specify an address in memory where data is either stored or retrieved. With direct addressing the data address location is specified directly by the communications controller.

When the input/output multiplexer has responded to the command of the communications controller by either retrieving data from memory or storing data in memory, a response is made in the form of an answer strobe completing the interrupt-answer cycle. Data will accompany the answer strobe if the command was to retrieve data from memory.

Figure 9A:
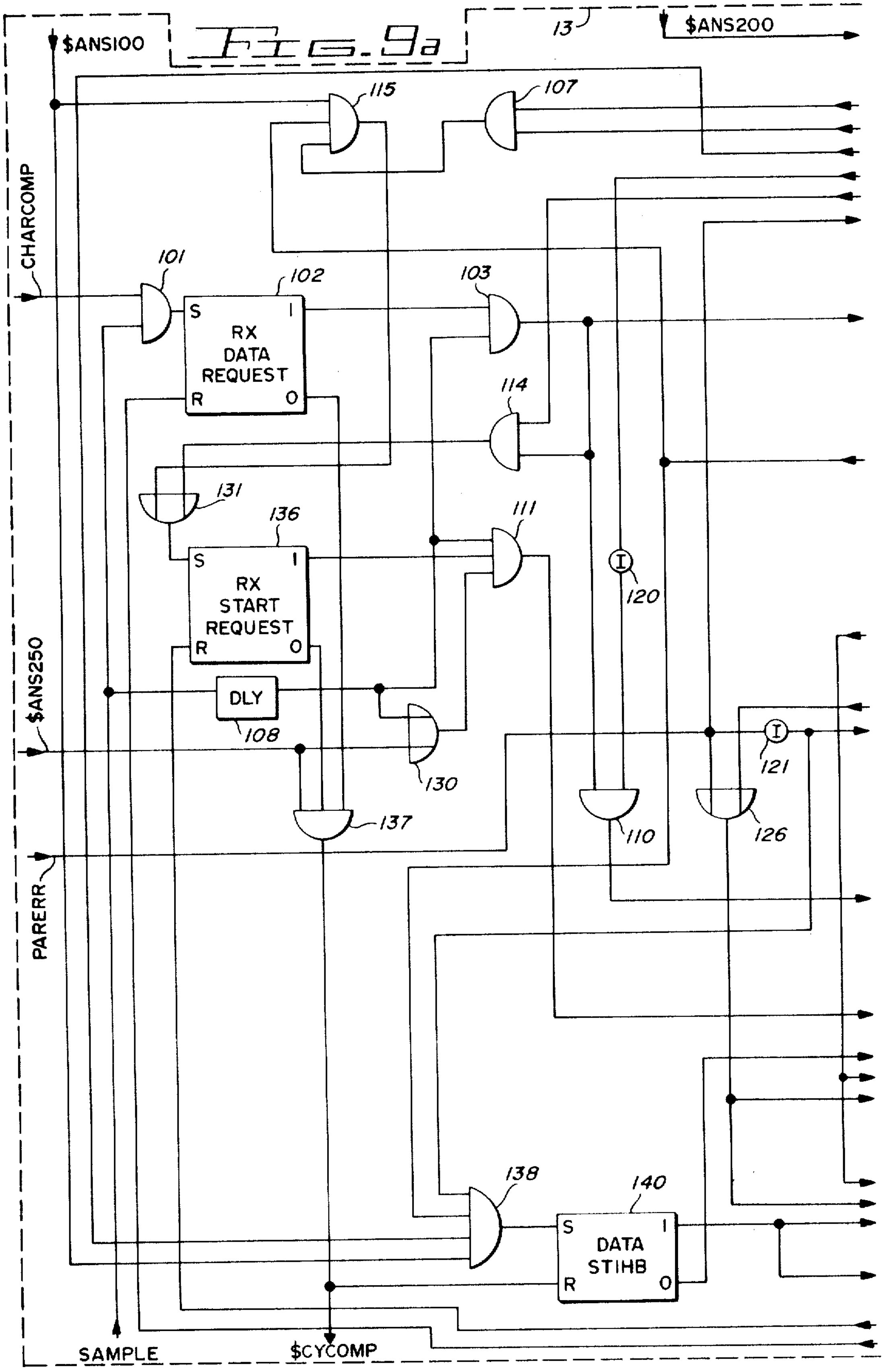
FIGS. 9*a* and 9*b* comprise a block diagram of a portion of the interrupt state sequencer shown in FIG. 8*a*.
Figure 9B:
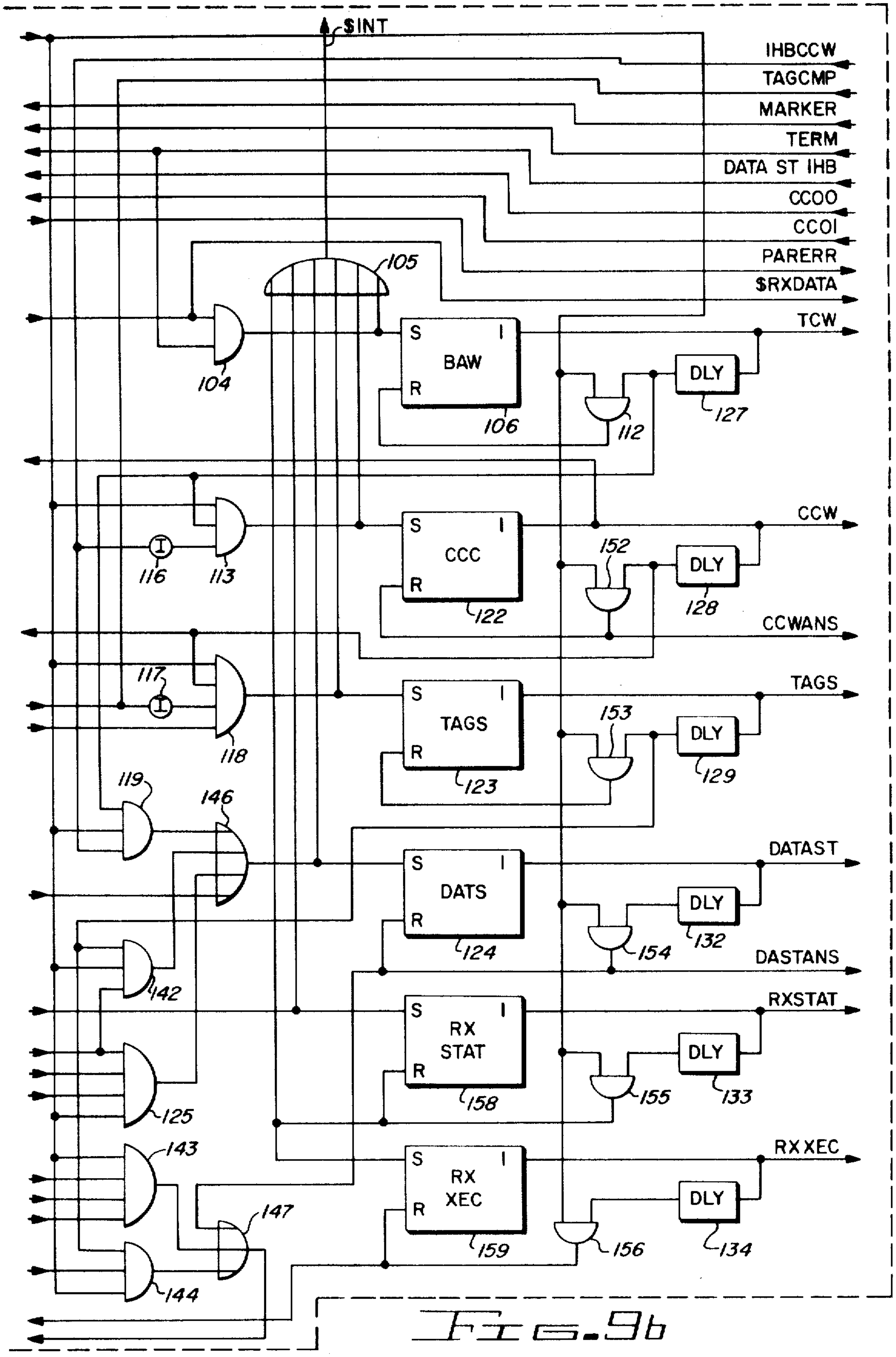

The scanner 9 shown in FIG. 8*a* contains a counter 10 that develops signals which are coupled to a pair of decoders 11 and 12. Decoders 11 and 12 provide signals which continuously scan the subchannels by providing a channel gate enable or "CGE" signal in succession to each of the subchannels 7*a*–7*n*. Decoders of the type which can be used in the present invention are shown on pages 349–352 in the text book, "-Pulse, Digital, and Switching Waveforms" by Millman and Taub, McGraw-Hill New York, New York 1965. When a subchannel which has received a complete message character is addressed by a CGE signal it responds by developing a character complete signal or CHARCOMP and a request access signal or REQACSS which causes the scanner to stop on the particular subchannel which developed the character complete signal. If no request for access is made when a subchannel is addressed the scanner continues to advance until it comes to a subchannel which does provide a character complete signal. The CHARCOMP signal is coupled to the Interrupt State Sequencer and Request Priority Register 13 shown in FIG. 8*a*. The operation of the sequencer 13 can be seen more completely by referring to FIGS. 9*a* and 9*b*. It should be noted that FIGS. 9*a* and 9*b* are drawn to be laid side by side so that the leads from the right side of FIG. 9*a* make connection with the leads from the left side of FIG. 9*b*.

In the subsequent discussion of the sequencer 13 the logic utilized employs the so-called "conventional" AND-gates, OR gates inverters, flip-flops, and delay lines. The AND-gates disclosed in FIGS. 9*a* and 9*b* provide a logical operation of conjunction for binary one signals applied thereto. In the system disclosed, a binary one is represented by a positive signal, the AND-gate provides a positive output signal representing a binary one when, and only when, all of the input signals applied thereto are positive and represent binary ones. The symbol identified by the reference numerals 101, 115, and 125 in FIG. 9 represent AND-gates having two, three, and four input terminals, respectively. Such AND-gates deliver a binary one output signal only when each of input signals applied thereto represent a binary one.

The OR logic signals are developed by OR gates which provide the logical operation of inclusive OR for positive signals applied thereto. The OR gate provides an output signal representing a binary one, when any one or more of the input signals applied thereto represent binary ones. When none of the input signals represent binary ones, the output signal represents a binary zero. The symbol identified by reference numerals 105 and 130 represent OR gates having six and two input terminals, respectively. An inverter provides the logical operation of inversion for an input signal applied thereto. The inverter provides a positive output signal representing a binary one when the input signal applied thereto is negative, representing a binary zero. Conversely, the inverter provides an output signal representing a binary zero when the input signal represents a binary one. Such a inverter is shown in FIG. 9*a* and is represented by the reference numeral 120.

A flip-flop, as the term is used in the description of this portion of the present invention, is a bistable device whose output is the function of its last input. Such a flip-flop is shown as and is represented by reference numeral 102 in the FIG. 9*a*. This flip-flop is a two input, two output device having set (S) and reset (R) input terminals and 1 and 0-output terminals. In this type of device, a binary one supplied to the set (S) terminal places the flip-flop into its set state in which condition there is a binary one at its 1-output terminal and a binary zero at its 0-output terminal. Conversely, a binary one supplied to the reset (R) terminal places the flip-flop into the state in which there is a binary one at its 1-output terminal and a binary zero at its 0-output terminal. The delay lines shown in FIGS. 9*a* and 9*b* provide a given predetermined amount of time delay for a signal applied to the input terminals thereof. The symbol identified by reference numeral 127 represents a delay line. A signal applied to the input lead on the right-hand end of delay line 127 is delayed for a predetermined amount of time and appears at the output lead at the left end of delay line 127.

When the scanner stops on a subchannel the scanner also develops a sample strobe or $SAMPLE which is applied to the request priority register 13 along with the CHARCOMP signal. The request priority register is designed to record the service request from the subchannels. In this disclosure only the stages of the request priority register which are useful in this invention are shown and discussed, but in actual practice numerous types of service requests can be made and the register must contain stages to service each of these types of requests. The requests are given priority in the order of their importance and the highest priority request is serviced first by the sample strobe. When any request for service is completed the stage of the register which services this request is reset and the next request in priority is serviced. Servicing of this subchannel continues until all of the requests from this channel have been serviced. The scanner is then allowed to advance sequentially to the other subchannels which are connected to the communications controller.

The interrupt state sequencer 13 controls the interrupt signals to the input/output multiplexer 4 and provides the associated signals for commands, byte selection, and addressing to the multiplexer. The sequencer is set in a first state by the character complete signal and remains in this state until an answer to the interrupt is received by the communications controller. When an answer strobe is received by the interrupt state sequencer this strobe causes the sequencer to advance to a new state. The interrupt-answer cycles once initiated continue until all the requests stored in the request priority register have been serviced.

The CHARCOMP and the $SAMPLE signals applied to AND-gate 101 (FIG. 9*a*), cause gate 101 to provide a set signal to the S input of the RX Data Request flip-flop 102. This signal sets flip-flop 102 so that it provides an output signal at its 1-output terminal which is applied to AND-gate 103. The signal from flip-flop 102 and the $SAMPLE which is delayed by a delay circuit 108 cause AND-gate 103 to provide an $RXDATA signal to AND-gates 104, 110 and 114, (FIGS. 9*a* and 9*b*). At this time signals from other portions of the communications controller cause a decision to be made as to which state the interrupt state sequencer will enter. Either a base address word state will be entered by setting the BAW flip-flop 106 or a data store state will be selected by setting the DATS flip-flop 124. The BAW state will be entered if a character count signal or CCOO from the character count logic is applied to the second lead of AND-gate 104. This CCOO signal is developed if a previously retrieved CCC for the subchannel did not contain a one, two or five in the command field.

Character counts are stored in the communications controller and memory registers 47*a*–47*n* (FIG. 8*b*) each of which correspond to one of the subchannels 7*a*–7*n*. As a subchannel is addressed the corresponding memory location in the memory register is also addressed by a signal from decoder 11. Two memory registers, designated the least character count memory register (LSBCC) and the most significant character register (MSBCC), are used to hold the character count for each subchannel. A binary one stored in the MSBCC and a binary zero in the LSBCC bit location indicates a count of two. A binary one stored in the LSBCC and a binary zero stored in the MSBCC indicates a count of one. When zeros are stored in both the MSBCC and the LSBCC the character count is zero.

When the character count is zero a positive value of the CCOO signal is provided by CC control 49 so that AND-gate 104 is enabled and the $RXDATA signal sets the BAW flip-flop 106 (FIG. 9*b*). When the character count is not zero, inverter 120 (FIG. 9*a*) inverts the CCOO signal and provides a positive signal which enables AND-gate 110 so that the signal from AND-gate 103 provides a voltage through OR-gate 146 to set DATS flip-flop 124. When either AND-gate 124 or OR-gate 146 provides an output signal this signal is coupled through OR-gate 105 to provide an interrupt strobe or $INT signal at its output. This $INT signal is coupled to the input/output multiplexer 4 shown in FIGS. 1 and 7.

At the same time the communications controller also provides signals on the command lines, the byte lines and the address lines which are connected to the input/output multiplexer. The state of the interrupt state sequencer and the interrupting subchannel determine which signals are provided to the input/output multiplexer. When the character count is zero so that the BAW flip-flop 106 is set signals from the sequencer 13 will be provided to the command encoder 15, the byte encoder 16, and the address encoder 17. The TCW signal from the BAW flip-flop causes the encoders to select an 18-bit BAW from the memory location which is unique to the subchannel which provided the complete character. The address of this BAW is formed by a combination of the address encoder 17 (FIG. 8*b*) and the scanning counter 10 (FIG. 8*a*) which provides a signal through gate 36 to the input/output multiplexer. The signal from the command encoder 15 causes the data to be read directly from the address given and places the data on the data output lines from the input/output multiplexer. Encoders of the type which can be used in the present invention are shown on pages 352–355 of the textbook, "-Pulse, Digital and Switching Waveforms" by Millman and Taub, McGraw-Hill, New York, New York 1965.

The retrieved 18-bit BAW is coupled to the data output register 20 shown in FIG. 8*a* and is accompanied by an answer strobe or $ANS which causes the data to be loaded into the register 20. The $ANS is also coupled to the answer strobe delay control circuit 21 which delays the $ANS for delivery to other portions of the communications controller. An answer strobe which is delayed 100 nanoseconds is labeled $ANS100, a strobe which is delayed 200 nanoseconds is $ANS200 etc. The BAW is then clocked into the BAW register 23 by the $ANS100 signal which is gated through AND-gate 35. Bits 9 and 10 of the BAW are combined with bits 6 and 7 of the message character by OR-gate 53 and 55 and are stored in the BAW register 23. Bits 6 and 7 of the message character from the subchannel are applied to OR-gate 54 and are stored in the message character register 24. The information which is now stored in the BAW register and the message character register consists of portions of BAW and bits 1 through 7 of the received message character will be used to determine whether a CCC will be retrieved from memory and, if so, the address of the memory location of the CCC which will be retrieved. As noted previously, if bit 11 of the BAW is a binary 1 and either bits 6 or 7 of the message are binary 1's, character logic gate 22 provides an inhibit CCC signal or IHBCCW which will prevent retrieval of a CCC from memory (see FIGS. 8*b* and 12).

200 microseconds after the $ANS has been received from the input/output multiplexer a $ANS200 signal applied to AND-gate 112 causes the BAW flip-flop 106 to be reset. At this time a decision is made whether to retrieve a CCC or to store the data character immediately. If an IHBCCW signal has been developed by logic gate 22 this signal is coupled to AND-gate 119 (FIG. 9) and to inverter 116. The IHBCCW signal and the delayed TCW signal from delay circuit 127 enable gate 119 so that the $ANS200 is coupled through OR-gate 146 and sets the DATS flip-flop 124. The signal from OR-gate 146 is coupled through OR-gate 105 to provide an $INT signal to the input/output multiplexer. At the same time the DATAST signal from the 1-output of the DATS flip-flop 124 provides signals to the command encoder 15, to the byte encoder 16 and to the address encoder 17. The DATAST signal from the sequencer 13 also enables Gate 27 (FIG. 8*a*) so that the message character which is received from the subchannel is coupled to the input/output multiplexer.

This message character from the subchannel is stored in memory by the input/output multiplexer by using an indirect control word for addressing and control. The address presented at the time of the interrupt is the address of the indirect control word or ICW which is associated with the subchannel. The command lines from the communications controller specify that indirect addressing is to be used and specifies the use of an ICW for character storage in memory.

When the input/output multiplexer has stored the message character in memory, the input/output multiplier provides an $ANS to the communications controller. This $ANS is delayed for 200 microseconds by answer strobe delay circuit 21 and applied to one lead of AND-gate 154. At the same time the DATAST signal from the 1-output of the flip-flop 124 is delayed by delay circuit 132 and applied to the other lead of AND-gate 154 thereby enabling AND-gate 154. AND-gate 154 provides a signal which resets the DATS flip-flop 124. This same signal is also coupled through OR-gate 147 to the reset terminal of the RXDATA Request flip-flop 102 thereby resetting flip-flop 102.

The answer strobe is further delayed by answer strobe delay control 21 and is applied as $ANS250 to one lead of AND-gate 137 (FIG. 9). Since the RX data request flip-flop 102 and the RX STAT request flip-flop 136 are reset these also provide signals to the other two leads of AND-gate 137 thereby enabling AND-gate 137 and providing a $CYCOMP or cycle complete signal to the reset terminal of data store inhibit flip-flop 140 so that flip-flop 140 is reset. This $CYCOMP is also applied to scanner control 9 (FIG. 8*a*) thereby causing counter 10 to start counting again and causing scanning signals to be applied to the other subchannels 7*a*–7*n* in the communications controller.

Returning to the condition where the interrupt state sequencer is in the BAW state, i.e., the BAW flip-flop 106 has been set, but now assume that there is no IHBCCW signal from logic 22 (FIG. 8*b*). The low value of IHBCCW signal which is coupled to the interrupt state sequencer 13 shown in FIGS. 9*a* and 9*b* is inverted by inverter 116 and applied to AND-gate 113. The delayed TCW signal from delay circuit 127 and the $ANS200 are applied to AND-gate 113 thereby enabling gate 113 and providing a signal to OR-gate 105 and to the set terminal of the CCC flip-flop 122 causing flip-flop 122 to be set. The signal to OR-gate 105 causes OR-gate 105 to couple a $INT signal to the input/output multiplexer as described above. Flip-flop 122 provides a CCW signal which is coupled to the command encoder 15, to gates 29 and 32 thereby gating the address of a CCC from the BAW register 23 and the CCC register 24 to the input/output multiplexer so that a CCC may be retrieved from a given address in memory.

The input/output multiplexer uses the $INT and the signals from gates 29 and 32 to select the designated CCC from memory and to return the CCC on the data out lines to the data "0" register 20 along with the $ANS which gates the CCC into register 20. The CCC us then coupled to decoder 43, to AND-gate 57, gate 44, tag comparator 39, and tag register 41 (FIG. 8*b*). If there is no parity error the PARERR signal from the subchannel has a low value of voltage. This low value of voltage is inverted by inverter 60 (FIG. 8*b*) and applied to AND-gate 40 along with the $ANS100 and the CCW signal thereby enabling gate 40 which provides a pulse to tag register 41 and to gate 44. This pulse gates the tag field portion of the CCC into the tag register 41 and gates the output of decoder 43 through gate 44 into the register 47*a*–47*n* which corresponds to the subchannel 7*a*–7*n* being serviced. Decoder 43 decodes the commands in the C field of the CCC while the resync and the parity error bits are stored directly in the memory register 47*a*–47*n*.

All commands associated with a CCC except the parity error inhibit command are ignored when the received message character contains a parity error. If the message character does contain a parity error the CCC which was retrieved due to the message character and the BAW being combined might be the wrong CCC, therefore the commands from the CCC are ignored. It can be seen in FIG. 8*b* that gate 40 is disabled by the parity error or PARERR signal which is inverted by inverter 60 and applied to gate 40. This inverted PARERR signal disables gate 40 so that the $ANS100 signal will not be gated through to the tag register 41. The PARERR signal is also inverted by inverter 121 (FIG. 9*a*) causing gate 138 to be disabled so that data store inhibit flip-flop 140 will not be set.

If there is no parity error, the commands in the CCC are decoded by decoder 43 and stored in the memory registers 47*a*–47 at $ANS100 time. If the C field of the CCC does contain a 100, which indicates a data store inhibit command, the decoder 43 develops a data store inhibit or DATASTIHB signal which is coupled to the interrupt state sequencer 13 and applied to one lead of AND-gate 128 (FIG. 9*a*). The CCW signal from flip-flop 122 is applied to a second lead of AND-gate 138. If there is no parity error the low voltage in the PARERR signal will be inverted by inverter 121 and applied to a third lead of AND-gate 138 so that when the $ANS100 is applied to the fourth lead of AND-gate 138 the data store inhibit flip-flop 140 will be set thereby providing an output at the 1-output terminal. When the DATASTIHB flip-flop 140 is set the low value of the signal from the 0-output disables AND-gates 125 and 142 so that the DATS flip-flop 124 cannot be set following the CCC or the TAGS state.

When the CCC contains a command field of "terminate now" (011) or "marker now" (111) this field is decoded by decoder 43, a binary "1" is placed in the T or M location of the proper memory register 47*a*–47*n* and a TERM or a MARKER signal is applied to interrupt state sequencer 13 (FIGS. 8*a* and 9). The Term or Marker signal is applied to OR-gate 107 which provides a signal to one of the input leads of AND-gate 115. At this time the CCC flip-flop 122 is set so that CCW signal is present at the 1-output terminal. This CCW signal is coupled to a second lead of AND-gate 115 thereby enabling AND-gate 115 so that $ANS100 is coupled through AND-gate 115 and through OR-gate 131 to set the RX STAT request flip-flop 136.

At $ANS200 time the CCC flip-flop 122 is reset by the CCW signal which is delayed by delay circuit 128 and applied to one lead of AND-gate 152 and by the $ANS200 signal which is applied to the other lead of AND-gate 152. The signal from AND-gate 152 which is labeled the CCWANS signal is coupled to AND-gate 57 (FIG. 8*b*) and enables gate 57. If bit 5 of the CCC is a binary 1 this binary 1 which is coupled through gate 57 to provide a signal to the set input terminal of the parity inhibit flip-flop or PE INH 69 thereby setting the parity inhibit flip-flop. When the parity inhibit flip-flop is set this disables AND-gate 59 and prevents any parity error status associated with the received message character from being stored in the memory registers.

At $ANS200 time a decision is made whether a tag store, a data store or neither state of the interrupt state sequencer will be entered. This decision is made by tag comparator 39 which compares the tag field of the CCC which is stored in tag register 41 with the tag field of the BAW which is stored in BAW register 23. If these two tag fields are identical a tag compare or TAGCMP signal is developed in tag comparator 39 and is coupled to the interrupt state sequencer 13 shown in FIGS. 8a and 9. The TAGCMP signal is applied through OR-gate 126 to AND-gates 125 and 143. The state of the DATA ST IHB flip-flop determines whether AND-gate 125 or AND-gate 143 will be enabled. If the CCC contains a command to inhibit storing the received data character, then the flip-flop 140 has been set as described above so that AND-gate 143 is enabled. If the C field of the CCC contains another command, flip-flop 140 will not be set so that AND-gate 125 will be enabled.

If flip-flop 140 is not set, the AND-gate 125 is enabled so that the $ANS200 is gated through AND-gate 125 and OR-gate 146 to the S terminal of the DATS flip-flop 124 thereby setting flip-flop 124. The signal which sets flip-flop 124 also provides an input to the OR-gate 105 which develops the $INT. Setting flip-flop 124 places the sequencer 13 in the data store state and provides a DATAST signal at the one output of the flip-flop 124. The DATAST signal is coupled to the command encoder 15, the byte encoder 16 and the address encoder 17 and provides command, byte, and address signals to the input/output multiplexer to accompany the $INT signal.

Memory addressing which is unique to the data store state, is controlled by the least significant address bit or LSB from the memory registers 47a–47n. A portion of the memory address of an indirect control word or ICW is stored in one of the memory registers 47a–47n. The ICW is then employed to obtain the address of an area or table in memory of a location where the message characters are to be stored. By switching the least significant address bit to the input/output multiplexer we can selectively address one of two different ICW's and therefore effectively switch from one table to another table. The ICW least significant bit address location stored in memory registers 47a–47n determine which of the two ICW's will be selected by the input/output multiplexer. A binary 0 stored in this ICW position of the memory register causes the first ICW to be selected from memory by the input/output multiplexer and a binary 1 stored in the ICW position of the memory register causes the second ICW to be selected from the memory. This signal which causes the multiplexer to switch from the first ICW to a second ICW is labeled SWICW and is coupled from the memory registers 47a–47n to the address encoder 17, through gate 36 to the input/output multiplexer (FIG. 8b).

When the input/output multiplexer is interrupted to store a data character, the responding $ANS at $ANS200 time is gated through AND-gate 154 (FIG. 9) since this gate has been enabled by the DATST signal from delay circuit 132. The DASTANS signal from AND-gate 154 provides a signal which resets flip-flop 124 and also ensures that the PE INH flip-flop 69 (FIG. 8b) is reset. The DASTANS signal is also gated through OR-gate 147 to reset the RX Data Request flip-flop 102 (FIG. 9).

Prior to the resetting of the Parity Error Inhibit or PE INH flip-flop 69, at $ANS100 time a message character parity error status is set in the memory register if a parity error exists and if the flip-flop 69 is not set. A signal from the zero lead of the PE INH flip-flop 69 and a signal from AND-gate 58 enable AND-gate 59 causing a binary 1 to be stored in the Parity Error or P.E. position of the memory registers 47a–47n. If the RX STAT Request flip-flop 136 is reset at $ANS250 time, the signal from the RX Data Request flip-flop 102, the signal from flip-flop 136 and the $ANS250 strobe cause AND-gate 137 to develop a cycle complete signal or $CYCOMP. This $CYCOMP signal resets Data State Inhibit flip-flop 140 (FIG. 9), and provides a signal which resets the scanner control 9 (FIG. 8a).

If, on the other hand, the RX STAT Request flip-flop 136 is set at $ANS250 time, gate 111 will be enabled by a signal from the "0" output lead of flip-flop 102, from the flip-flop 136 and by the $ANS250 which is coupled through OR-gate 130. This signal from AND-gate 111 sets the RX STAT flip-flop 158 and provides an interrupt or $INT signal through OR-gate 105 to the input/output multiplexer. When the RX STAT flip-flop 158 is set it develops the RXSTAT signal at the 1-output terminal. The RXSTAT signal is coupled to gate 25 (FIG. 8a) and gates the status signals from memory registers 47a–47n out to the input/output multiplexer over the "data in" lines. At the same time the RXSTAT signal and signals from the Scanner Control 9 are coupled to the command encoder 15, the byte encoder 16, and the address encoder 17 which develops signals that are sent to the input/output multiplexer.

It was previously mentioned that the buffer-switch bit in the CCC can be used to switch from the first ICW to a second ICW to steer data from one section of the memory to another section of the memory. This switching is done by the circuitry comprising inverters 71 and 72 and AND-gates 74 and 75 shown in FIG. 8b. When a binary 1 is stored in a buffer-switch bit of the CCC this causes a binary 1 to be stored in the SW position of one of the memory registers 47a–47n. This binary 1 from the SW position of the memory register supplies a signal to AND-gate 51. When the RX STAT flip-flop is set an RXSTAT signal is applied to gate 51 so that when the $ANS100 signal is supplied to gate 51 this gate is enabled and supplies a pulse to AND-gate 74 and 75. The binary bit in the ICW position of the memory register 47a–47n is supplied to inverter 71 to AND-gates 74 and 75 and through inverter 72 so that the binary bit in the ICW position is changed. For example, if a binary 1 is stored in the ICW position, this binary 1 is supplied to AND-gate 75 along with the signal from AND-gate 51 and produces a binary 1 at the output of gate 75. This binary 1 is inverted by inverter 72 and writes a binary zero in the ICW position of register 47a–47n. The next time the $ANS100 strobe causes a signal to appear at the output of AND-gate 51 the binary zero from the ICW position is inverted by inverter 71 and applied to AND-gate 74 and enables AND-gate 74. This signal from AND-gate then causes binary 1 to be stored in the ICW position of the memory register 47a–47. The signal from the ICW position is coupled through address encoder 17 to the input/output multiplexer.

At $ANS200 time AND-gate 155 (FIG. 9) is enabled by the RXSTAT signal and by the $ANS200 signal. AND-gate 155 produces a signal which resets the RX STAT flip-flop 158, sets RX XEC flip-flop 159 and provides a $INT signal through OR-gate 105 to the input/output multiplexer. The RX SEC flip-flop 159 develops the RX XEC signal which is coupled to execute encoder 28, command encoder 15, byte encoder 16 and address encoder 17. These encoders develop signals which cause a program interrupt and by providing signals on the interrupt level lines notify the program which subchannel has stored status prior to the interrupt and notify the program which of the status stores cause the interrupt.

An $ANS signal is received back from the input/output multiplexer is delayed and at $ANS200 time provides a $ANS200 signal to the AND-gate 156. The $ANS200 signal and the signal from delay line 134 cause AND-gate 156 to provide a signal which causes the RX XEC flip-flop 159 and the RX STAT Request flip-flop 136 to be reset. At $ANS250 time the signals from the RX DATA request flip-flop 102, from RX STAT request flip-flop 136 and the $ANS250 signal enable AND-gate 137 and provide the $CYCOMP signal which resets the DATA STIHB flip-flop 140. The $CYCOMP signal also starts the scanner as described above.

We have return to the condition where the interrupt state sequencer is in the CCC state, but now assume that the tag field of the BAW and the CCC are different. When the tag field and the CCC in the tag field in the BAW are different the tag comparator 39 develops a low value of output for the TAG COMP signal. This low value signal is inverted by inverter 117 (FIG. 9) and applied to AND-gate 118 with delayed CCW signal also applied to a second lead of AND-gate 118. If there is no parity error the PARERR signal is low and is inverted by inverter 127 and applied to $\overline{\text{AND}}$-gate 118. At $ANS200 time the $ANS200 signal enables AND-gate 118 so that the TAGS flip-flop 123 is set and an interrupt signal is applied through OR-gate 105 to the input/output multiplexer. The TAGS flip-flop 123 develops a TAGS signal which is applied to gate 26 (FIG. 8*a*) so that the contents of the tag register 41 (FIG. 8*b*) is gated through gate 26 to the data in lines which carry the contents of the tag register to the input/output multiplexer. Thus the content of the tag register 41 is written into the memory thereby changing the BAW tag field.

When the $ANS signal is received from the input/output multiplexer at $ANS200 times AND-gate 153 (FIG. 9) is enabled so that the TAGS signal from the delay circuit 129 causes a TAGS flip-flop 123 to be reset. This delayed signal from circuit 129 is also applied to one lead of AND-gates 142 and 144. One of the gates, 142 or 144 will be enabled by a signal from the DATA STIHB flip-flop 140 and $ANS200 signal will then be gated through either gate 142 or gate 144. If the DATA STIHB flip-flop 140 is set the $ANS200 signal is gated through AND-gate 144 through OR-gate 147 and causes the RX DATA request flip-flop 102 to be reset. If the DATA STIHB flip-flop 140 is reset AND-gate 142 is enabled so that the $ANS200 signal will be gated through AND-gate 142 through OR-gate 146 and sets DATS flip-flop 124.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

We claim:

1. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means; and means connected to said controller means for using said unique character to determine the disposition of said received message character.

2. The combination as defined in claim 1 including:

means connected to said controller means for using a portion of a received message character and a portion of said retrieved base address word to selectively inhibit the retrieval of a character control character from said memory.

3. The combination as defined in claim 1 including:

means connected to said controller means for using a portion of a received message character and a portion of said retrieved base address word to selectively inhibit the retrieval of a character control character from said memory and means connected to said controller means to store and received message character in said memory when the retrieval of said character control character is inhibited.

4. In a data communication system, the combination comprising:

a plurality of sources of message characters;

a memory for receiving and storing instructions and data;

means connected to said memory for supplying a plurality of base address words each of said words corresponding to one of said sources, said words being stored in said memory;

means connected to said memory for supplying a plurality of character control characters and for storing them in said memory;

controller means, said controller means being connected between said memory and each of said sources;

means connected to said memory for retrieving a base address word from memory when a message character is received from one of said sources and for storing said word in said controller means, said retrieved word corresponding to said one of said sources supplying said message character;

means connected to said controller for combining a portion of said retrieved word with a portion of said received message character to obtain the address of a unique character control character in said memory;

means connected to said memory for retrieving said unique character and for storing said unique character in said controller means;

means coupled to said controller for using said unique character to determine the disposition of said received message character;

means coupled to said controller for comparing a tag portion of said retrieved base address word with a tag portion of said unique character;

means connected to said controller for modifying said tag portion of said retrieved base address word to correspond with said tag portion of said unique character; and means coupled to said controller for storing said modified base address word in said memory.

5. The combination as defined in claim 4 wherein:

said means for storing said modified base address word in said memory includes means for storing said modified word in the same address in memory from which said word was previously retrieved.

6. In a data communication system, the combination comprising:

a plurality of sources of message characters;

a memory for receiving and storing instructions and data;

means connected to said memory for supplying a base address word corresponding to each of said sources, said words being stored in said memory;

means connected to said memory for supplying a plurality of character control characters and for storing said control characters in a plurality of tables in said memory with each table containing character control characters corresponding to the message characters of a corresponding code set;

a communications controller, said controller being connected between said memory and each of said sources;

means connected to said memory for retrieving a base address word from memory when a first message character is received from a first one of said sources and for storing said word in said controller, said retrieved word corresponding to said first one of said sources;

means connected to said controller for combining a portion of said retrieved word with a portion of said first message character to obtain the address of a first character control character from said first table;

means connected to said memory for retrieving said first character control character from said memory and for storing said first control character in said controller;

means connected to said controller for comparing a tag portion of said retrieved base address word with a tag portion of said first control character;

means connected to said controller for modifying said tag portion of said retrieved base address word to correspond with said tag portion of said first control character;

means connected to said controller for storing the modified base address word in said memory;

means connected to said memory for retrieving said modified base address word from said memory when a second message character is received from said first one of said sources and for storing said modified word in said controller;

means connected to said controller for combining a portion of said modified base address word with a portion of said second message character to obtain the address of a second character control character from a second table;

means connected to said memory for retrieving said second control character from said memory and for storing said second control character in said controller; and means connected to said controller for using said second control character to determine the disposition of said second message character.

7. The combination as defined in claim 6 including:

means for using a portion of a received message character and a portion of said retrieved base address word to selectively inhibit the retrieval of a character control character from said memory; and means connected to said memory to cause said received message character to be stored in said memory when the retrieval of said character control character is inhibited.

8. The combination as defined in claim 6 wherein:

said means for storing said modified base address word in said memory includes means for storing said modified word in the same address in memory from which said word was previously retrieved.

9. The combination as defined in claim 6 including:

means connected to said controller for using said first control character to determine the disposition of said first message character.

10. In a data communication system, a combination comprising:

a plurality of sources of message characters;

a memory for receiving and storing instructions and data;

means connected to said memory for supplying a base address word corresponding to each of said sources, said words being stored in said memory;

means connected to said memory for supplying a plurality of character control characters and for storing said control characters in a plurality of tables in said memory with each table containing character control characters corresponding to the message characters of a corresponding code set;

a communication controller, said controller being connected between said memory and each of said sources;

means connected to said memory for retrieving the base address word from memory when a message character is received from a first one of said sources and for storing said word in said controller, said retrieved word corresponding to said first one of said sources;

means connected to said controller for combining a portion of said retrieved base address word with a portion of a received message character to obtain the address of a character control character in one of said tables;

means connected to said memory for retrieving a character control character from one of said tables in said memory and for storing said control character in said controller;

means connected to said controller to use character control characters from a first table to determine the disposition of message characters in a first code set;

means connected to said controller to use character control characters from a second table to selectively switch operations from said first table to a third table;

means connected to said controller for using said character control characters from said third table to determine the disposition of message characters in a second code set; and means connected to said controller for using said character control characters from a fourth table to selectively switch operations of said third table to said first table.

11. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means;

means connected to said controller means for using a portion of said unique character to determine if said received message character is to be stored in said memory; and means connected to said memory to selectively store said received message character in said memory.

12. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means;

means connected to said controller means for using a portion of said unique character to determine that said received message character is the terminate character of an incoming message;

means connected to said memory for storing said terminate character in said memory; and means connected to said memory for storing a status word which indicates that a terminate character has been received by said controller means.

13. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means;

means connected to said controller means for using a portion of said unique character to determine that a received message character is a terminate character and that said terminate character is to be followed by a predetermined number of additional characters;

means connected to said memory for storing said terminate character and said additional characters; and means connected to said memory for storing a status word which indicates that a terminate character and the additional characters have been received by said controller means.

14. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means;

means connected to said controller means for using a portion of said unique character to determine that a marker character has been received by said controller means;

means connected to said memory for storing said marker character in said memory; and means connected to said controller means for providing a program interrupt when said marker character is received by said controller means.

15. The combination as defined in claim 14 including:

means for storing a status word in said memory when a program interrupt is provided by said controller means.

16. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved words corresponding to one of said sources supplying said message character, said retrieved word being stored in said controller means;

means connected to said controller means for combining a portion of said retrieved word with a portion of said received message character to obtain the address of a unique character control in memory;

means connected to said memory for retrieving said unique character and for storing said unique character in said controller means;

means connected to said controller means for using a portion of said unique character to determine that a marker character has been received by said controller means;

means connected to said controller means for storing said marker character is said memory; and means connected to said controller means for storing a status word in memory which indicates that a marker character has been received by said controller means, said status word being stored after a final message character has been received by said controller means.

17. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means;

means connected to said controller means for using a portion of said unique character to determine that said received message character is the terminate character of a synchronous message; and means connected to said controller means for using a portion of said unique character to cause said controller means to operate in a search mode when said terminate character is received by said controller means.

18. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of said received message character to obtain the address of a unique character control character in memory;

means connected to said memory for retrieving said unique character and for storing said unique character in said controller means;

means connected to said memory for supplying a plurality of indirect control words and for storing them in said memory;

means connected to said controller means for using a portion of said unique character to retrieving an indirect control word from said memory;

means connected to said controller means for using said indirect control word to determine an area in said memory where message characters are to be stored; and means connected to said memory for storing message characters in said area in said memory.

19. In a data communication system, the combination comprising:

a plurality of sources of message characters;

a memory for receiving and storing instructions and data;

controller means, said controller means being connected between said memory and each of said sources;

means connected to said memory for supplying a plurality of base address words each of said words corresponding to one of said sources, said words being stored in said memory;

means connected to said memory for supplying a plurality of character control characters and for storing them in said memory;

means connected to said memory for retrieving a base address word from memory when a message character is received from one of said sources, said retrieved word corresponding to one of said sources supplying said message character, said retrieved word being stored in said controller means;

means connected to said controller means for combining a portion of said retrieved word with a portion of a first received message character to obtain the address of a first unique character control character in said memory;

means connected to said memory for retrieving said first unique character and for storing said first unique character in said controller means;

means connected to said memory for supplying a plurality of indirect control words and for storing them in said memory;

means connected to said controller means for using a portion of said first unique character to retrieve a first indirect control word from said memory;

means connected to said controller means for using said first indirect control word to determine a first area in said memory where a first group of message characters are to be stored;

means connected to said controller means for combining a portion of said retrieved base address word with a portion of a second received message character to obtain the address of a second unique character control character in memory;

means connected to said memory for retrieving said second unique character and for storing said second unique character in said controller means;

means connected to said controller means for using a portion of said second unique character to retrieve a second indirect control word; and means connected to said memory for using said second indirect control word to determine a second area in said memory where a second group of second message characters are to be stored.

20. In a data communication system, the combination comprising:

a plurality of sources of message characters;

a memory for receiving and storing instructions and data;

controller means, said controller means being connected between said memory and each of said sources;

means connected to said memory for supplying a plurality of base address words, each of said words corresponding to one of said sources, said words being stored in said memory;

means connected to said memory for retrieving a base address word from memory when a message character is received from one of said sources, said retrieved word corresponding to one of said sources supplying said message character, said retrieved word being stored in said controller means;

means connected to said controller means for checking lateral parity of a received message character and for developing a signal when a parity error is detected;

means connected to said controller means for combining a portion of said retrieved word with a portion of said received message character to obtain the address of a unique character control character in memory;

means connected to said memory for retrieving said unique character and for storing said unique character in said controller means; and means connected to said controller means for using a portion of said unique character to selectively inhibit the checking of lateral parity of said received message character.

* * * * *